United States Patent [19]
Myers et al.
[11] 3,786,201
[45] Jan. 15, 1974

[54] AUDIO-DIGITAL RECORDING SYSTEM

[76] Inventors: John P. Myers, 1513 Highvale Trl., Topanga Canyon, Calif. 90290; Gleb Tschapek, P.O. Box 506, Hermosa Beach, Calif. 90254

[22] Filed: Feb. 4, 1972
(Under Rule 47)

[21] Appl. No.: 223,532

[52] U.S. Cl. 179/100.2 R, 179/100.2 K, 340/174.1 G
[51] Int. Cl. .............................................. G11b 5/02
[58] Field of Search .............. 179/100.2 R, 100.2 K; 340/174.1 G, 174.1 K, 174.1 A, 174.1 B, 172.5, 347 SH, 347 AD, 347 DA; 178/DIG. 3, 6.6 A

[56] References Cited

UNITED STATES PATENTS

| | | | |
|---|---|---|---|
| 3,588,836 | 6/1971 | Frazier, Jr. | 340/174.1 G |
| 3,340,368 | 9/1967 | Wohlrab et al. | 179/100.2 K |
| 3,272,918 | 9/1966 | Koll et al. | 179/100.2 K |
| 3,644,910 | 2/1972 | Smith | 179/100.2 R |
| 3,603,725 | 9/1971 | Cutler | 178/DIG. 3 |
| 3,479,648 | 11/1969 | Sleven et al. | 340/174.1 G |
| 3,685,031 | 8/1972 | Cook | 340/174.1 K |
| 3,621,150 | 11/1971 | Pappas | 179/100.2 K |

*Primary Examiner*—Vincent P. Canney
*Assistant Examiner*—Alfred H. Eddleman
*Attorney*—Spensley, Horn & Lubitz

[57] ABSTRACT

A system for converting an input analog signal, such as an audio signal or signal representative of sound into a digital form for storing in digital form and for reconstructing the input analog signal from the digital form is disclosed. The system includes sampling means for converting the input audio signal into a binary format which includes ranging bits and adjusted magnitude bits. This permits the recording in digital form of audio signals of a wide dynamic range with a reduced number of bits. Additionally, the disclosed encoding method for encoding digital words prior to recording reduces pulse crowding on magnetic tape and achieves higher bit packing densities. The system may be used with existing professional audio tape drives with tape speeds of approximately 30 ips or less.

32 Claims, 11 Drawing Figures

PATENTED JAN 15 1974 3,786,201

SHEET 01 OF 11

PATENTED JAN 15 1974

3,786,201

SHEET 03 OF 11

AUDIO-DIGITAL RECORDING SYSTEM

BACKGROUND OF THE INVENTION

1. Field of the Invention

The invention relates to the field of recording analog signals in digital form and for converting the digital form back to the original analog signals.

2. Prior Art

Professional audio recording, for the most part, begins in a studio where four, eight or sixteen tracks of sound are recorded on a master tape and subsequently "mixed" into a sub-master tape of a single monaural or two stereo tracks or four quadraphonic channels. This sub-master tape is then used as a basis for manufacturing both record discs and magnetic tapes. With this method of recording the professional studio depends heavily upon the recording on magnetic tape of signals representative of sound in analog form. All the deficiencies inherent with this type of recording technique are thus embodied in the master and sub-masters and become part of all subsequent copies including discs. The deficiencies of the present system are well known and include limited dynamic range partly due to the low signal-to-noise ratio inherent in magnetic tape recordings, harmonic, phase-shift and intermodulation distortions, and limited transient response. In addition, there are problems in storing magnetic tapes when recorded with audio signals due to magnetic interaction of adjacent tape layers.

By way of example, the first generation master tape measures approximately 64 db in signal-to-noise ratio referred to a recording level which corresponds to about one per cent (1%) third harmonic distortion. This 64 db signal-to-noise ratio is measured at a mid-frequency, usually about 400 Hz to 1 K Hz, but at higher frequencies, due to the record equalization, the high frequency dynamic range is reduced by 10 to 15 db. Because of this, the attack transients and overtones of many instruments cannot be recorded in their original perspective at normal zero level without severe distortion. This partially accounts for the "muddiness" and lack of presence in many recordings. In any event, since master tapes must be copied, even with tape copying equal in quality in every way to that of the original master, the second generation tape copy loses 3 db of signal-to-noise ratio. Two more generations can degrade the signal-to-noise ratio by another 3 db, so that after the fourth generation 7 db signal-to-noise ratio may be lost. Thus, multi-channel master tape mixdowns, for example, mixing a 16 channel master to a two-channel sub-master could result in the loss of about 9 db in signal-to-noise ratio due to the rms addition of tape noise. This, of course, presumes that the electronic noise is well below the basic tape noise. On the other hand, recording audio signals in digital form, particularly where saturation recording is utilized, a signal-to-noise ratio of 80 db over the audible spectrum is possible with a total harmonic distortion of less than 0.5 percent at peak recording levels.

While digital recording techniques for recording data with extreme accuracy are extensively used in the computer industry and for instrumentation, such techniques have not found their way to any significant degree to the audio recording field. One reason for this may be the fact that the equipment used in the computer industry and for instrumentation is quite sophisticated and thus very costly. For example, most digital recording techniques require the use of very high precision tape transport mechanisms to minimize possible errors which can be caused by flutter, wow, dynamic skew, drop-outs, etc. Additionally, tape speeds of more than 100 ips are not uncommon in such uses. Professional sound recording studios cannot tolerate either the complexity or the high cost of such tape transport systems. By way of comparison, much of the professional audio recorders used to produce master tapes have speeds of 15 to 30 ips. As will be seen, with the presently disclosed invention, audio signals may be recorded in digital form on magnetic tapes with tape speeds comparable to those presently used by professional studios to record the analog, audio signals. Additionally, and perhaps more importantly, the existing tape recorders may be modified for recording audio signals in digital form as taught by this disclosure.

SUMMARY OF THE INVENTION

A system for converting input analog signals such as audio signals into digital signals representative of the input analog signals for recording in digital form; and, for reconstructing or reconverting the resultant digital signals into the original input analog signals is described. The input analog or audio signal, after conditioning, is sampled by a sampling means at a rate of approximately 66 K Hz; the sampling means includes, in the presently preferred embodiment, two amplifiers and two sample and hold circuits, the overall gain of which is automatically adjusted to provide one of four predetermined gains. The input analog or audio signal is also sensed by a comparator network and through a range encoder the gain of the sampling means is adjusted to one of the four predetermined overall gains as a function of the magnitude of the sampled input analog signal, such that the amplitude of the output signal from the sampling means falls within a predetermined range of amplitudes. This output signal is converted into an 8-bit digital word (referred to herein as "the adjusted magnitude bits") by an analog-to-digital converter. Two ranging bits, from the range encoder, which represent one of the four overall gains of the sampling means, is serially added to the eight adjusted magnitude bits. The ranging bits and adjusted magnitude bits are alternately coupled into a track-A record buffer and a track-B record buffer, since in the presently preferred embodiment each audio input signal is recorded in the form of two separate digital signals. The information from each of the buffers is encoded along with a preamble used to identify the beginning of each digital word in a track-A and track-B word phasing encoder. The output of each encoder is coupled to a record driver which serves the function of providing positive and negative pulses for recording a magnetic tape in a saturation mode.

The recorded signals in digital form are restored to analog form in the reproduce or playback position of the system which includes a word sync detector for detecting the preamble associated with each digital word and for providing timing for the reproduce portion of the system. The raw data from the recorder is first restored to its original "square" form prior to recording by use of a delay differentiator network. The restored raw data after being decodedd in a track-A and track-B data decoder, is coupled to a track-A and track-B deskew buffer. These buffers are used to convert the two tracks of digital information to a single continuous digital track and to eliminate any timing errors that may exist in the raw data due to tape skew. After the ranging bits have been removed from each of the digital words the adjusted magnitude bits are converted to analog form and the result of each such conversion is amplified by the amount of gain represented by the ranging bits associated with that digital word. After this amplification and some output conditioning, the plurality of these signals represent the input analog or audio signal.

It is an object of the present invention to provide a system adaptable for recording an analog signal such as an audio signal in digital form and for converting the digital signal back into its original analog form.

It is still a further object of the present invention to provide a system for recording audio signals in digital form wherein presently utilized audio tape drives may be employed for recording the digital information.

It is still another object of the present invention to provide a system for recording audio signals in digital form such that better frequency response, signal-to-noise ratio, and dynamic range, less harmonic, phase and intermodulation distortion, better transient response, and less cross-talk, flutter and wow, may be obtained than with presently utilized audio recording equipment.

BRIEF DESCRIPTION OF THE DRAWINGS

FIGS. 5, 6 and 8 together illustrate primarily in block diagram form the entire reproduce portion of the system.

FIG. 11 is an electrical schematic illustrating the data decoder of FIG. 6.

DETAILED DESCRIPTION OF THE INVENTION

The detailed description is divided into two major sections; the first section describes the structure and operation of that portion of the system associated with recording, that is, that portion of the system which converts an input analog signal to an output digital signal or signals for recording on a recording medium such as magnetic tape. FIGS. 1 through 4 will be utilized in conjunction with this explanation. The second section of the application involves the reproduction portion of the system, that is, the portion of the system which reconstructs the input audio signal from the digital signal. FIGS. 5 through 11 will be utilized to explain the structure and operation of this portion of the system.

While the present system is explained in conjunction with the use of an input audio signal, that is, an analog signal representative of sound, it will be apparent that the system may be utilized for converting other analog signals into digital form and for reconstructing the analog signals from digital form for recording purposes as for transmission. Additionally, the present system is described in conjunction with the use of a magnetic tape recorder. Other types of recording media may be used in lieu of the magnetic tape recorder such as those associated with optical recording schemes, discs, etc.

In the presently preferred embodiment of the invention, two ranging bits and eight adjusted magnitude bits are utilized for each digital word in addition to a fixed number of preamble bits for each word. It will be obvious that other word lengths may be utilized in lieu of those disclosed. Also in the following description of the presently preferred embodiment, a single audio signal is converted into two digital signals which are recorded on separate tracks of a magnetic tape. It will be apparent that the audio signal may be recorded on a single track such as a single track of a magnetic tape, particularly where higher tape speeds are utilized.

Figure 1:
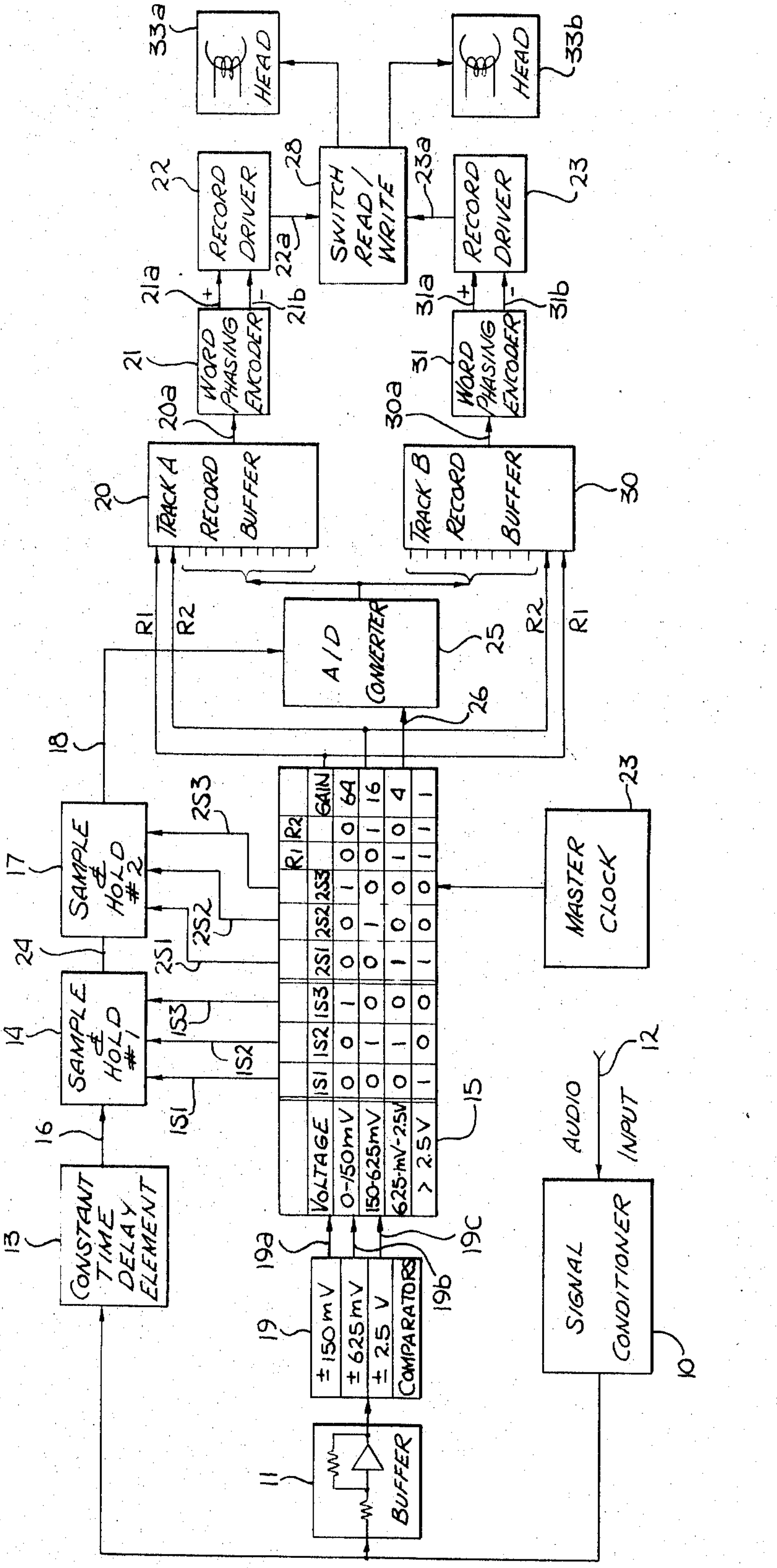
FIG. 1 is a block diagram of the record portion of the present system which illustrates the processing of an audio input signal up to the point where it is recorded in digital form.

Referring to FIG. 1, the input audio signal, in analog form, is applied to the system and in particular to signal conditioner 10 on lead 12. This signal, which is an analog signal, may be obtained from any one of numerous sources of audio signals, such as microphone preamplifiers. The signal conditioner 10 serves to condition the input audio signal prior to the signal being processed by the remainder of the system. In the presently preferred embodiment the signal conditioner 10 comprises a low pass filter having a corner at approximately 20 K Hz the low pass filter is used to produce a sharp cut-off characteristic as is often done in sample data systems. The low pass filter may be of ordinary construction, and commercially available filters may be used in this application. Since the presently preferred embodiment of the invention is described in conjunction with an audio application, with the intent of recording data between 20 and 20 K Hz, the low pass filter was selected for this purpose. It will be apparent that if the system is to be implemented to handle a different range of frequencies, the low pass filter may be selected to correspond to the desired frequency band intended to be processed by the system.

The output from the signal conditioner 10, which is of course an analog signal, is coupled to both a constant time delay element 13 and a buffer 11. The buffer 11 may be an ordinary buffer amplifier of low noise construction utilized to match impedances between the signal conditioner 10 and the comparator circuits 19. Note each section of the comparator comprises two circuits one for detecting a positive polarity and the other for detecting a negative polarity and hence lead 19a, 19b and 19c each comprise two control leads. The comparator circuits 19 comprises those comparators circuits, each for detecting a signal of a predetermined magnitude and for providing a binary output voltage or signal when the input signal to the comparator is approximately equal to or greater than the predetermined magnitude. The first section of the comparator circuits 19 detects an input audio signal having an approximately greater than or equal to ± 150 mV. If such a signal is detected by the comparator circuits 19 a binary signal is produced on leads 19a. The second section of the comparator circuits detects the input voltage of approximately ± 625 mV or greater. If such a voltage is detected by this section of the comparator circuits, a signal is produced on leads 19b. Likewise, the third section of the comparator circuits is designed to sense a voltage of approximately ± 2.5 V or greater and to produce a signal on leads 19c if such a signal is applied to the comparator circuits 19. The comparator circuits may be any one of numerous circuits designed for detecting electrical signals of a predetermined magnitude. It will be apparent that if a signal of approximately ± 2.5 V or greater is applied to the comparator circuits 19 an output signal will be produced on leads 19a, 19b and 19c. Likewise, if a signal greater than ± 150 mV but less than ± 625 mV is applied to the comparator circuits 19, an output will appear on only leads 19a. Also, it should be noted that if a signal is applied to comparator circuits 19 of less than approximately ± 150 mV, no signals will appear on any of the leads 19a, 19b and 19c, and hence the presence of such a signal is also detected.

The leads 19a, 19b and 19c from the comparator circuits 19 are coupled to the range encoder 15 which is illustrated in FIG. 1 in the form of a truth table showing the input and output logic associated with the encoder. The six discrete input signals to encoder 15 are used to indicate one of four states in the encoder each of the states being associated with a predetermined magnitude range of the input signal of comparator circuits 19. The range encoder 15 receives as inputs, in addition to the signals from the comparator circuits 19, a master clocking signal from master clock 23. The outputs of range encoder 15 includes leads 1s1, 1s2, 1s3 which apply discrete signals to sample and hold circuit 14 and leads 2s1, 2s2, 2s3 which are used to apply discrete signals to sample and hold circuit 17. In addition, the output from range encoder 15 includes 2 range bits on leads R1 and R2 which are coupled to track-A record buffer 20 and track-B record buffer 30. A timing signal which is applied to A/D converter 25 from encoder 15 via lead 26, has its origin from the master clock 23.

The column under the heading "Voltage," in left hand side of the table shown in encoder 15 represents the input logic to the encoder and indicates that there are four possible input logic states. The first state indicates a voltage between approximately 0 and ± 150 millivolts, being applied to comparator circuits 19, the second being a voltage between approximately ± 150 millivolts and ± 625 millivolts being applied to comparator circuits 19, the third state being a voltage of approximately ± 625 millivolts to 2.5 volts being applied to comparator circuits 19, and the last state being a voltage of approximately ± 2.5 volts or greater applied to comparator circuits 19. These states are readily derivable from the discrete signals applied to the range encoder 15 on leads 19a, 19b and 19c.

The columns in the table shown for range encoder 15 under the headings 1s1 through 2s3 indicate the presence or absence of a binary signal on the respective leads for the voltage condition indicated in the left hand column. For example, if a voltage of approximately ± 150 millivolts to ± 625 millivolts is applied to comparator circuits 19 no signal will be applied to lead 1s1, a binary signal will be applied to lead 1s2, no signal will be applied to lead 1s3, no signal will be applied to lead 2s1, a binary signal will be applied to lead 2s2, and no signal will be applied to lead 2s3. The next two columns headed R1 and R2 indicate the logic for the ranging bits, that is, the presence or absence of a discrete signal on leads R1 and R2 for each of the four possible voltage states indicated in the left hand column. For example, if the input voltage to comparator circuits 19 is approximately ± 2.5 volts or greater a signal will appear on lead R1 and R2. The last colum entitled "Gain" indicates the overall gain, that is, the total gain for the sample and hold means which comprises sample and hold circuit 14 and sample and hold circuit 17. These gains are the predetermined overall gains of the sample and hold circuits when the corresponding signals on leads 1s1 through 2s3 are applied to these circuits. Thus, for example, if a signal of approximately ± 2.5 volts or greater is applied to the comparator circuits 19, the indicated discrete voltages applied to the leads 1s1 through 2s3 will cause the overall gain of sample and hold circuits 14 and 17, that is, the gain between a signal appearing on lead 16 and a signal appearing on lead 18, to be one or unity. Similarly, if a signal of less than ± 150 millivolts is applied to the comparator circuits 19, the overall gain between leads 16 and 18 would be 64. This gain, of course, is reflected in the ranging bits R1 and R2 for each of the four predetermined gains. The range encoder 15 may be constructed using well-known logic circuits. It should also be noted that any comparable logic scheme which produces the same results as range encoder 15 may be utilized in lieu of the specific logic shown in the table of encoder 15.

Master clock 23 may be an ordinary master clock used for producing timing signals. In the presently preferred embodiment, as will be seen, master clock 23 which employs a crystal controlled oscillator, produces timing signals at the sampling frequency of 66 K Hz and timing signals at multiples of this frequency such as 462 K Hz shown in FIG. 4 as the 2X clock.

The constant time delay element 13 in the presently preferred embodiment comprises an RC delay element having an approximately constant time delay between 20 Hz and 20 K Hz of approximately 1.5 microseconds. The purpose of the constant time delay element 13 is to delay the output signal from the signal conditioner 10 such that for any given sample of a signal applied to sample and hold circuit 14, the discrete signals applied to sample and hold circuits 14 and 17 on leads 1s1 through 2s3 correspond to the magnitude of the given sample in accordance with truth table shown in range encoder 15. Thus, the time delay element compensates for the delay in the comparator circuits 19 and for any delays in the range encoder 15 plus a time equal to the operative time of the sample and hold of circuit 14. Any type of time delay circuitry may be used for time delay element.

The sample and hold means in the presently preferred embodiment comprises two separate sample and hold circuits 14 and 17 which are coupled in series. Each of these circuits includes an amplifier and a holding means, which is a capacitor. The basic timing, that is, the sampling rate and aperture times are provided from the master clock 23 and leads 1s1 through 2s3. This information is provided through these leads in the form of the frequency and period of the binary signals indicated in the table of encoder 15.

In the presently preferred embodiment sample and hold circuit 14 has an aperture time of approximately 1 microsecond and a hold time of approximately 2 microseconds. Sample and hold circuit 17 has an aperture time of approximately 3 microseconds and a hold time of approximately 10 microseconds. Each of the amplifiers utilized in sample and hold circuits 14 and 17, such as amplifier 52 in FIG. 2, may be identical and in the preferred embodiment have a slew rate of approximately 100 volts per microsecond.

Figure 2:
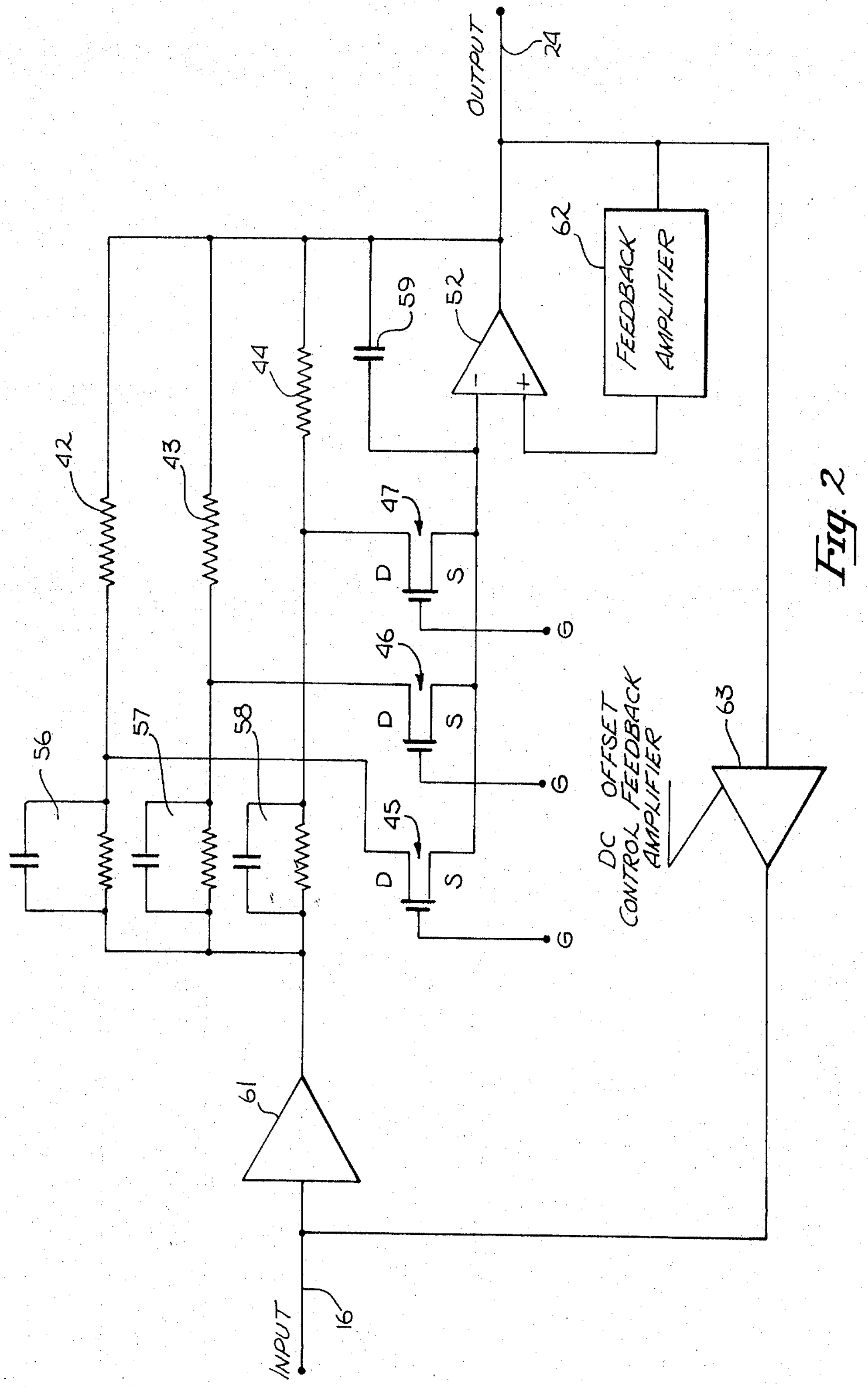
FIG. 2 is an electrical schematic illustrating a single sample and hold circuit such as the sample and hold circuits illustrated in FIG. 1 in block diagram form.

Referring to FIG. 2, a schematic of a sample and hold circuit such as circuit 14 or 17 is illustrated. The input to the sample and hold circuit of FIG. 2 is illustrated as input 16 and the output as lead 24. It should be noted that if the circuit of FIG. 2 is used for sample and hold circuit 17, the input to the circuit would be coupled to lead 24 and the output to lead 18, FIG. 1. The gates of field effect transistors 45, 46 and 47 are coupled through driving circuits to leads 1s1, 1s2 and 1s3 respectively, of FIG. 1. Likewise, if the sample hold circuit of FIG. 2 was used for the sample and hold circuit 17 of FIG. 1, the gates of field effect transistors 45, 46 and 47 would be coupled to leads 2s1, 2s2 and 2s3, respectively. The "1's" shown in the table for range encoder 15 are intended to indicate that when the 1 is applied to any of the driving circuits of field effect transistors 45, 46 and 47, a conductive path will exist between the drain and source of the field effect transistor, that is, the field effect transistors will be "on."

The input lead 16 is coupled to the input of a power drive amplifier 61. An ordinary power drive amplifier may be used for this application. The output of amplifier 61 is coupled to three RC "Lead" networks 56, 57 and 58, each of which comprises a parallel combination of a resistor and a capacitor. The other terminal of the RC networks 56, 57 and 58 are coupled to the drains of the field effect transistors 45,46 and 47, respectively, and resistors 42, 43 and 44, respectively. The other terminals of the resistors 42, 43 and 44 are coupled to the output of amplifier 52. A capacitor 59 is coupled between the output of amplifier 52 and one of the two input leads to amplifier 52 to form an integrator. A feedback amplifier 62 which is used to provide slope control feedback, is coupled between the output of amplifier 52 and the other of the input terminals to amplifier 52. A DC offset control feedback amplifier 63 has its input coupled to the output of amplifier 52 and its output coupled to the input of amplifier 61. The feedback amplifiers 62 and 63 are constructed in accordance with ordinary practices in the art.

The gain of the sample and hold circuit of FIG. 2 will be a function of the signals applied to the gates of field effect transistors 45, 46 and 47. For example, if transistor 45 is on, while trannsistors 46 and 47 are off, the gain of the stage will have one predetermined magnitude whereas if transistor 46, while transistors 45 and 47 are off, the circuit will have a second predetermined gain.

In the circuit of FIG. 2 the RC networks 56, 57 and 58 are lead networks intended to compensate for the lag network associated with the capacitor 59, the selected resistor 42, 43 or 44 and the amplifier 52. The gain of the circuit is primarily determined by the ratio of the selected resistor 42, 43 or 44 as compared with the networks 56, 57 and 58, respectively, while the hold time is primarily a function of the holding capacitor 59 and resistors 42, 43 or 44.

In the presently preferred embodiment, two sample and hold circuits 14 and 17 were selected for the audio application since they provide an overall slew rate great enough to provide the desired amplification with the selected sampling rate of 66 K Hz. In applications where it is intended to record analog signals having a frequency range less than 20 Hz to 20 K Hz or having a dynamic range of less than that discussed in conjunction with the presently preferred embodiment, a single sample and hold circuit may be used or if amplifiers such as amplifier 52, are utilized which have an appropriate slew rate, then a single sample and hold circuit such as the one shown in FIG. 2 may be utilized.

It has been found that with the sampling technique illustrated in FIG. 1, an input audio signal having a wide dynamic range may be represented with fewer bits than with other presently used techniques. Also by sampling the input audio signal at the amplifier a minimum amount of distortion results as compared with prior art systems such as those that utilize non-linear amplifiers or logrithmic amplifiers of audio signal before they are digitized.

The sample magnitude of the input analog signal is coupled from sample and hold circuit 17 to the analog-to-digital converter 25 by lead 18. The analog-to-digital converter 25 may be standard converter. In the presently preferred embodiment the analog-to-digital converter is one which utilizes successive approximation digitizing techniques and which has an 8-bit output referred to herein as the "modified magnitude bits." A/D converter 25 is biased as a bipolar A/D converter. Lead 26 couples timing signals into the A/D converter 25 so that the conversion occurs sychronously with the sampling of the sampling means, at the rate of 66 K Hz. The output of the A/D converter 25 is coupled alternately first to track-A record buffer 20 and then to track-B record buffer 30. The range bits R1 and R2 are also alternately coupled to the track-A and track-B recorder buffers 20 and 30. The transfer of the modified magnitude bits from the A/D converter 25 to the buffers is performed in a parallel operation.

The track-A and track-B record buffers perform the function of converting the 8-bits representing the modified magnitude and the two ranging bits from a parallel word to a serial word and in addition, the record buffers add four additional bits, which are control bits to each word. Thus, the record buffers 20 and 30 may be standard digital buffers which utilize shift registers. The serial output words from the track-A record buffer are coupled to the word phasing encoder 21 by 20*a;* similarly the output from the track-B record buffer 30 is coupled to word phasing encoder 31 by lead 30*a.*

The word phasing encoders 21 and 31 perform the function of encoding the words from the record buffers into a self-clocking digital signal. The output from word phasing encoder 21 is coupled to record driver 22 by leads 21*a* and 21*b*, while the output from word phasing encoder 31 is coupled to record driver 23 by leads 31*a* and 31*b*. The record drivers 22 and 23 provide driving signals for the recording head of a magnetic tape recorder. The outputs from the record drivers 22 and 23 are coupled to switch 28 to a magnetic head which in the presently preferred embodiment is a single magnetic head having at least two sections 33a and 33b such that two channels or tracks of digital information may be recorded simultaneously on the same magnetic tape. The switch 28, which may be an ordinary switching means, couples the drive signal to the magnetic head when digital information is being recorded and as will be seen in the reproduce portion of the system, when the digital information is being played back, switch 28 couples the digital information to the reproduce portion of the system. The magnetic transducer comprising the magnetic head 33 shown as extensions or sections 33a and 33b in the presently preferred embodiment is a magnetic head adaptable for recording digital information having a low impedance and a gap of less than 25 microinches. The same magnetic head is used both for writing and reading information in the system.

In the presently preferred embodiment, tape speeds of approximately 30 inches per second are utilized for recording and playing back the digital information. With these tape speeds, as will be seen from the subsequent description, approximately 16,000 bits per inch per track are recorded on the magnetic tape. Standard tape drives which are utilized for professional audio equipment may be utilized as previously mentioned.

Figure 3:
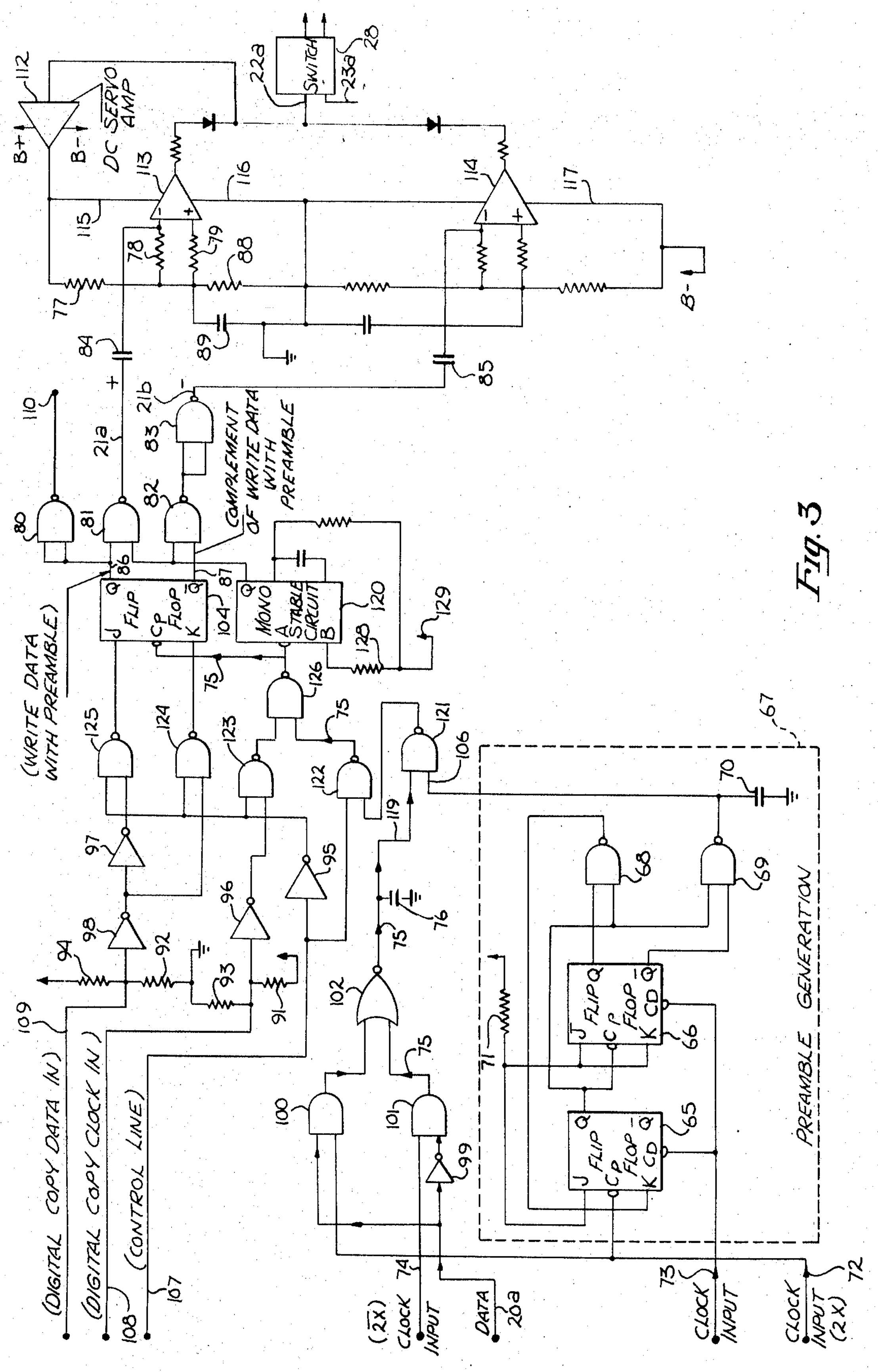
FIG. 3 is an electrical schematic illustrating a single word phasing encoder and record driver such as are shown in the block diagram of FIG. 1.

Referring to FIG. 3, a detail diagram of word phasing encoder 21 and record driver 22 is shown. It will be apparent that the circuits shown in FIG. 3 may also be utilized for the word phasing encoder 31 and the record driver 23. The inputs to the circuit of FIG. 3 are the input data 20*a* which is the output of track-A record buffer 20, and three clock inputs from master clock 23 shown as leads 72, 73 and 74. The lead 72 couples the clock timing signal 2x which in the presently preferred embodiment is 462 K Hz to the clock terminal $C_p$ of flip-flop 65 and to one input terminal of AND gate 100. Clock input 73, which is a 66 K Hz clock input, is utilized to reset flip-flops 65 and 66. The clock input on lead 74 is $\overline{2x}$ (not 2x or the compliment of 2x) and this clock timing signal is applied to one input terminal of AND gate 101.

The input data to the circuit of FIG. 3 is applied to the circuit through lead 20a with the main data flow through the circuit shown generally by the arrows 75. The dotted line 67 entitled "Preamble Generator" represents the circuitry which generates a preamble at the beginning of each of the digital words. The output from the circuit of FIG. 3 is shown on lead 22*a*, which is the output from record driver 22 of FIG. 1. The circuit of FIG. 3 also includes input leads 107 Control Line, 108 Digital Copy Clock In and 109 Digital Copy Data In and an output lead 110 which furnishes a Digital Copy Monitor Drive Signal. These leads, with their interconnecting circuitry, as will be explained in more detail, are an added feature of the system which enables digital-to-digital copying between two recorders both of which include the presently disclosed system. The circuitry in effect, reshapes the output from a master reproduce recorder before it is re-recorded on a slave recorder.

The input data to the circuit of FIG. 3 is applied to inverter 99 via lead 20a; the output of inverter 99 is coupled to the other output terminal of AND gate 101, while the output of AND gate 101 is coupled to one input terminal of NOR gate 102. The other input terminal to NOR gate 102 is coupled to the output of AND gate 100. The data from lead 20a is also coupled to one of the other input terminals of AND gate 100. The output of NOR gate 102 is coupled to one input terminal of NAND gate 121. A capacitor 76 is coupled to ground and to the lead interconnecting the output of NOR gate 102 and NAND gate 121. The other input to NAND gate 121 is lead 106; this lead provides the preamble control signal and actual preamble signal which is integrated into the data words and becomes part of each word at the beginning of each word, as will be shown in conjunction with FIG. 4.

The preamble generation section shown within dotted line 67 comprises flip-flops 56 and 66 and NAND gates 68 and 69. The J-terminals of flip-flops 65 and 66 and the K-terminal of flip-flop 66 are coupled to a logic "one" voltage source through resistor 71. The K-terminal of flip-flop 65 is coupled to the output of NAND gate 68. One input terminal of NAND gate 68 is coupled to the Q-terminal of flip-flop 66, while the other input terminal to NAND gate 68 is coupled to one input terminal of NAND gate 69, the Q-terminal of flip-flop 65 and the $C_p$ terminal of flip-flop 66. The other input terminal to NAND gate 69 is coupled to the $\overline{Q}$-terminal of flip-flop 66 while the output from NAND gate 69 is coupled to ground through capacitor 70 and to lead 106 which is an input to NAND gate 121. This circuit (shown within dotted line 67) counts three (3) clock pulses after each reset (lead 73) and then enables NAND gate 121 thereby producing the preamble for each word.

The main flow of the data and the preamble from NAND gate 121 is through NAND gate 122 and NAND gate 126 to the A-terminal of monostable circuit 120 and the $C_p$ terminal of flip-flop 104. The write data with preamble lead 86 is coupled to one input terminal of NAND gate 81 and also to both input terminals of NAND gate 80 an inverter, the output of which is lead 110. The complement of the write data with preamble, lead 87 couples the $\overline{Q}$-terminal of flip-flop 104 with one input terminal of NAND gate 82. The other terminals input to NAND gates 81 and 82 are coupled to the Q-terminal output from monostable circuit 120. The B-terminal of monostable circuit 120 is coupled to a voltage supply through resistor 128 and lead 129. The output of NAND gate 81 is coupled through lead 21*a* and capacitor 84 to the negative terminal of write amplifier 113, while the output of NAND gate 82 is coupled through an inverter, comprising NAND gate 83, lead 21*b* and capacitor 85 to the negative terminal of the write amplifier 114.

The digital copy data in lead 109, is coupled to the input of inverter 98, to a source of voltage through resistor 94 and to ground through resistor 92. Likewise, the digital copy clock in, lead 108, is coupled to the input of inverter 96, to a source of voltage through resistor 91 and to ground through resistor 93. The control line 107 is coupled to the input of inverter 95 and also to the other input terminal of NAND gate 122. The output of inverter 98 is coupled to one of the input terminals of NAND gate 124 and to the input tof inverter 97. The output of inverter 95 is coupled to one input terminal of the NAND gate 123, gate 124 and gate 125. The other input terminal of NAND gate 123 is coupled to the output of inverter 96 while the other input terminal of NAND gate 125 is coupled to the output of inverter 97. The output of NAND gate 123 is coupled to one input terminal of NAND gate 126, the output of NAND gate 124 is coupled to the K-terminal of flip-flop 104 and the output of NAND gate 125 is coupled to the J-terminal of flip-flop 104. It will be apparent that when the digital copy mode is activated (by applying a "0" to lead 107), data will not flow from lead 20*a* through the "AND OR INVERT tree" comprising gate 100, gate 101 and gate 102 since gate 122 will block the data path. Similarly, data on lead 109, and clocking signals on lead 108 will flow through gate 123, gate 124 and gate 125 and to the record driver section of FIG. 3.

Write amplifiers 113 and 114 which are high slew rate operational amplifiers, are coupled to lead 22*a* and switch 28 through a resistor and a diode. The diodes prevent the amplifiers from driving each other in opposite polarities. A DC servo amplifier 112 is utilized to minimize the DC component in the output signal. DC servo amplifier 112 which regulates the positive DC supply has its input coupled to lead 22*a*, while its output is coupled to the positive power supply lead of amplifier 113 through lead 115, and resistors to the negative terminal of amplifier 113 through resistors 77 and 78. The positive terminal of amplifier 113 is coupled to ground through resistor 79 and a parallel combination of resistor 88 and capacitor 89. The terminals of resistors 78 and 79 which are not coupled to amplifier 113 are common.

in FIG. 3, the NAND gates, NOR gates, flip-flops, monostable circuit, DC servo amplifiers, operational amplifiers and other components shown therein may utilize ordinary components built in accordance with known techinques.

Referring to FIGS. 1 and 2, the operation of the record portion of the system insofar as the processing of the analog signal is concerned, may be readily seen. After the input analog or audio signal is conditioned, it is simultaneously applied to the comparator circuits 19 and the constant time delay element 13. The comparator circuits 19 in conjunction with the logic circuits of range encoder 15 determine which of the leads 1s1 through 2s3 will be activated in accordance with the truth table shown in range encoder 15. As seen in FIG. 2, as the discrete signals are applied to leads 1s1 through 2s3 a predetermined number of field effect transistors, such as transistors 45, 46 and 47, are activated thereby coupling the input signal on leads 16 to amplifier 52 and simultaneously determining the gain of the amplifier 52. Note that since sample and hold circuits 14 and 17 are in series, and since the periodic sampling commands are applied to both circuits simultaneously on lead 1s1 through 2s3, the input analog signal on lead 16 is also present on line 24 although there is some lag due to the sample and hold circuit 14. Thus, the output signal on lead 18 of sample and hold circuit 17 comprises a plurality of amplitude samples which in the presently preferred embodiment occurs at a rate of 66 K Hz. These amplitude samples are converted to the modified magnitude bits in A/D converter 25 and then alternately supplied to track-A record buffer 20 and track-B record buffer 30 with the ranging bits R1 and R2.

Figure 4:
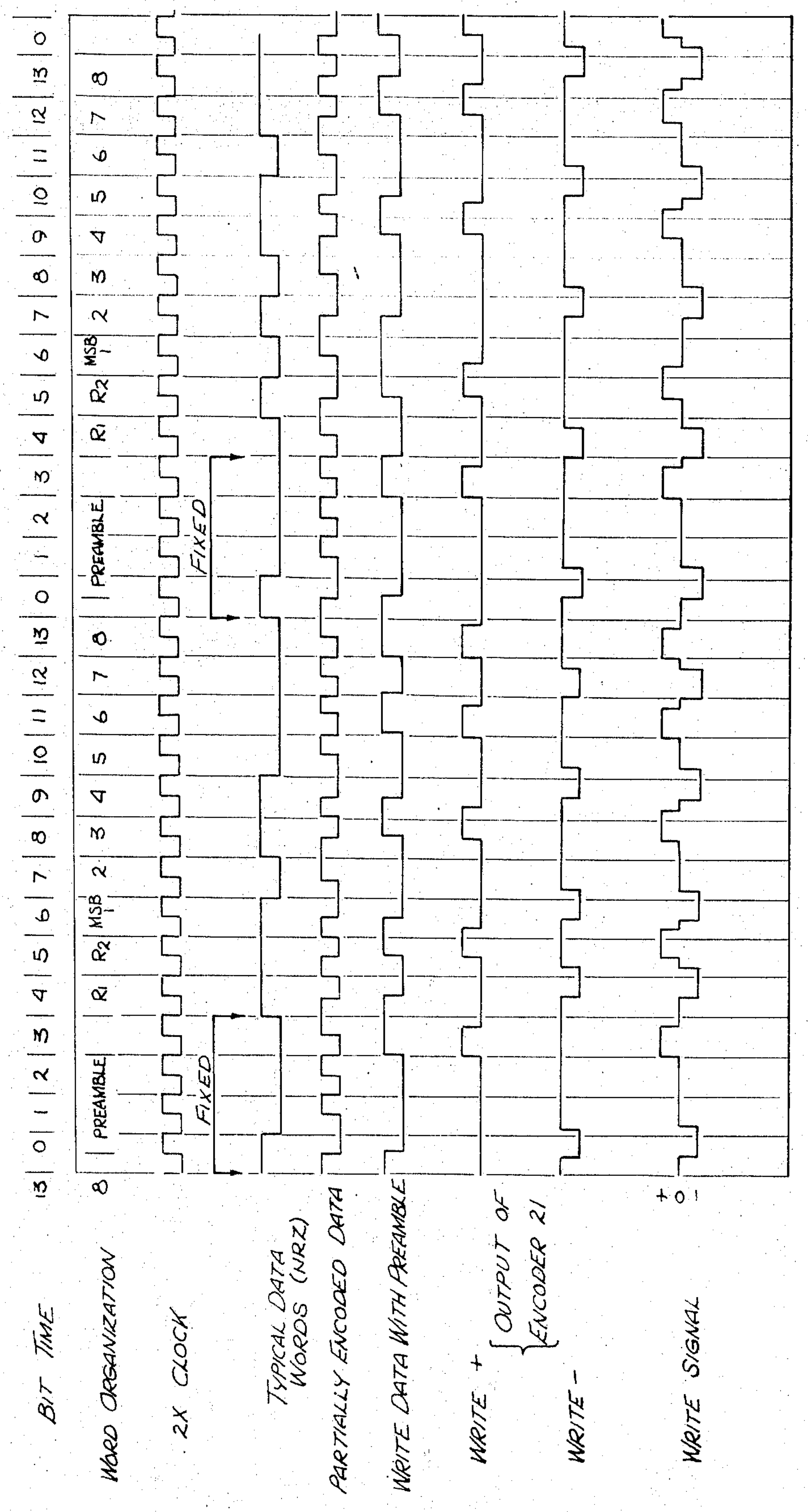
FIG. 4 is a graph illustrating various wave forms associated with the record portion of the system.

Referring now to FIGS. 1, 3 and 4, the record portion of the system involved with processing the digital data may be readily understood. Referring first to FIG. 4, the first line entitled "Bit Time" illustrates that in the presently preferred embodiment, 14 bit words are utilized. In the line entitled "Word Organization" the organization of each of the digital words is shown. The first four bits are utilized in part for the preamble, bits 4 and 5 are utilized for the ranging bits, and bits 6 through 13 are utilized for the eight bits of the modified magnitude with bit 6 which is the most significant bit. The following line of FIG. 4 illustrates the 2x clock which is the clock pulse applied to lead 72 of FIG. 3.

The line entitled "Typical Data Work NRZ" (Non-return to zero) illustrates typical data words and a fixed section of each word which is added to the word by the record buffers 20 and 30. Hence the "Typical Data Words" line represents the output of the record buffers 20 and 30. Note that since the output of the A/D converter 25 along with the appropriate ranging bits are alternately supplied to buffers 20 and 30, the typical data word line may represent the output from the buffer 20 or buffer 30, that is, the signal appearing on lead 20*a* or lead 30*a*, since the 2x clock is seven times faster than the basic sampling rate of 66 K Hz.

The word phasing encoder 21, in addition to other functions, implements the following encoding algorithm:

If 2x and data are high (the output is 0), or
if 2x and data are low (the output is 0).

That is to say, if the 2x clock and the data line both have the upper values, shown in FIG. 4, the resultant encoded signal which is shown on the line entitled "Partially Enclded Data" in FIG. 4 will have a low state. Likewise, if the 2x clock is low and the data is high, the partially encoded data will be high. The partially encoded data shown in FIG. 4 represents the signals which would appear on lead 119 of FIG. 3. Inverter 99, AND gate 100 and AND gate 101 and NOR gate 102 implement the above described encoding algorithm. The output of AND gate 102 is essentially the encoded data, except for the addition of the preamble and the dividing of the signal and other modifications resulting from flip-flop 104 and monostable circuit 120. In FIG. 4 the preamble on the write data with preamble line is two and a half bits times in duration and is generated at the beginning of each word by the preamble generator shown in FIG. 3. As will be seen, these preambles are used for the generation of synchronizing signals in the reproduce portion of the system.

The partially encoded data along with the preamble to each word applied at NAND gate 121 is coupled to the $C_p$ terminal of flip-flop 104; the write data with preamble which is shown in FIG. 4 being present on lead 86 and a complement of that signal appearing on lead 87. Monostable 120 provides a write current control pulse having a constant pulse width every time there is a negative-going change of state in the signal appearing at the output of NAND gate 126. In the presently preferred embodiment this pulse width is approximately 30 percent of a bit time. The gating caused by this write current control pulse results in the waveform on leads 21*a* and 21*b* shown in FIG. 4 as the write + and write − lines (output of encoder 21). The duration of the write current control pulse is determined by the effective gap length of the magnetic tape head and by the tape velocity, such that the effects of pulse crowding and DC level shift upon playback are minimized, as shown in the "Reproduce Voltage" waveform of FIG. 7. The pulse width is less than one bit time in duration and is approximated by the following relationship:

$$W = K(l/V), \text{ where}$$

W = pulse width
l = effective electrical gap width
V = tape velocity
K = constant which is a function of the composition and thickness of the magnetic tape coating and degree of head to tape contact With this particular write current and pulse width technique, the playback voltage at the lower frequencies is equally attenuated by approximately 6 db, such that in comparison with prior art recording systems, the linear range of the high frequency response of the system is extended.

The write current control pulse signals thus produced on leads 21*a* and 21*b* are used to drive amplifiers 113 and 114, such that they supply a write current of both polarities according to the combination of signals on leads 21*a* and 21*b*, as shown schematically by the "Write Signal" wave form in FIG. 4. The record driver circuit of FIG. 1 and FIG. 3, the inputs to which are leads 21*a* and 21*b*, and the output of which is lead 22*a*, may be used to drive one segment or section of a multiple section magnetic transducer such as section 33*a*.

Thus by the use of the above described encoding and writing techniques, a recording is produced in which the problems of pulse crowding and level shift, common to prior art high-density system, is reduced.

Figure 5:
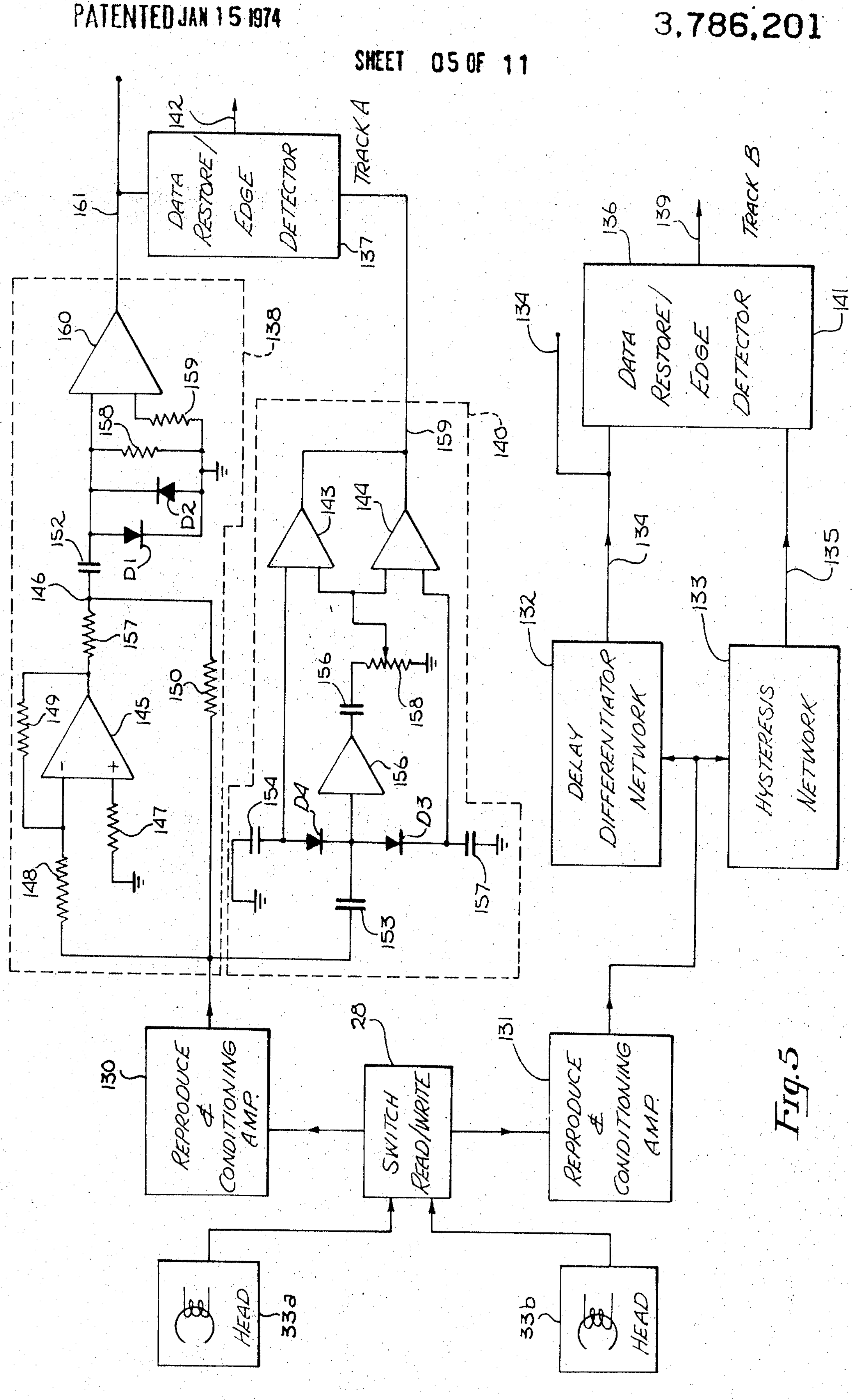
FIG. 5 is a block diagram which also contains electrical schematics for the delay differentiator and hysteresis networks, illustrating the first section of the reproduce portion of the system.
Figure 7:
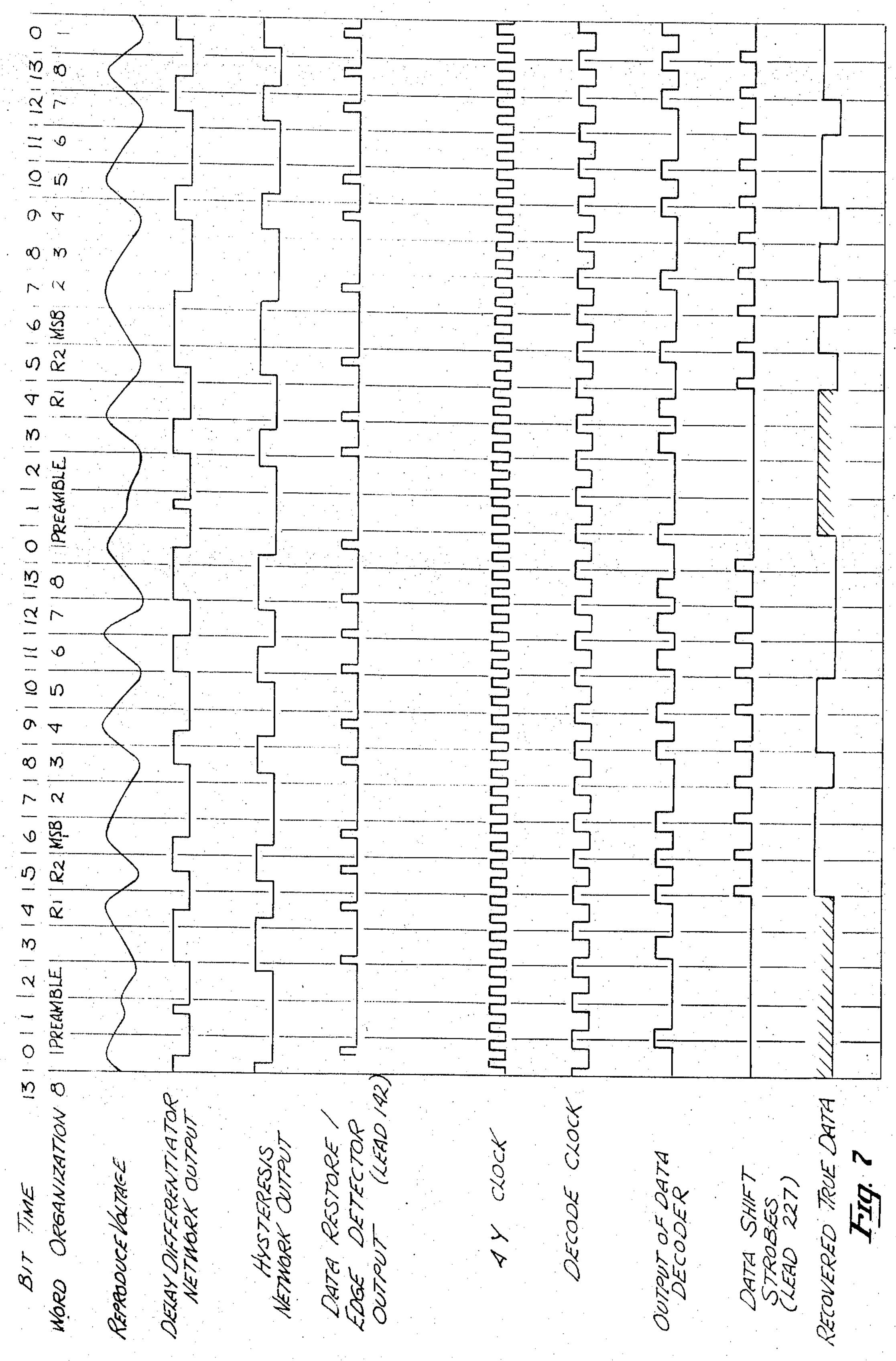
FIG. 7 is a graph illustrating the various wave forms associated with the reproduce portion of the system.

The first section of the reproduce portion of the system shown in FIG. 5 receives the two tracks of digital information from magnetic head sections 33*a* and 33*b* and produces a modified restored data on leads 139 and 142 which corresponds to the Data Restore Edge Detector output of FIG. 7. During the reporduce operation of the system switch 28 couples signals from the magnetic head sections 33*a* and 33*b* to amplifiers 130 and 131 as opposed to coupling the head to the record driver 22 and record driver 23 of FIG. 1 during the recording operation. Reproduce and conditioning amplifiers 130 and 131 each comprise an amplifier and is the presently preferred embodiment a low pass filter having a cutoff frequency of approximately 250 K Hz. The output from the reproduce and conditioning amplifiers 130 and 131 is applied both to a delay differentiator network such as network 132 and a hysteresis network such as network 133. The delay differentiator network for track-A is shown in detail within dotted line 138 while the hysteresis network for track-A is shown in detail within dotted line 140. The networks 132 and 133 may be identical to the networks shown within dotted lines 138 and 140, respectively.

Figure 6:
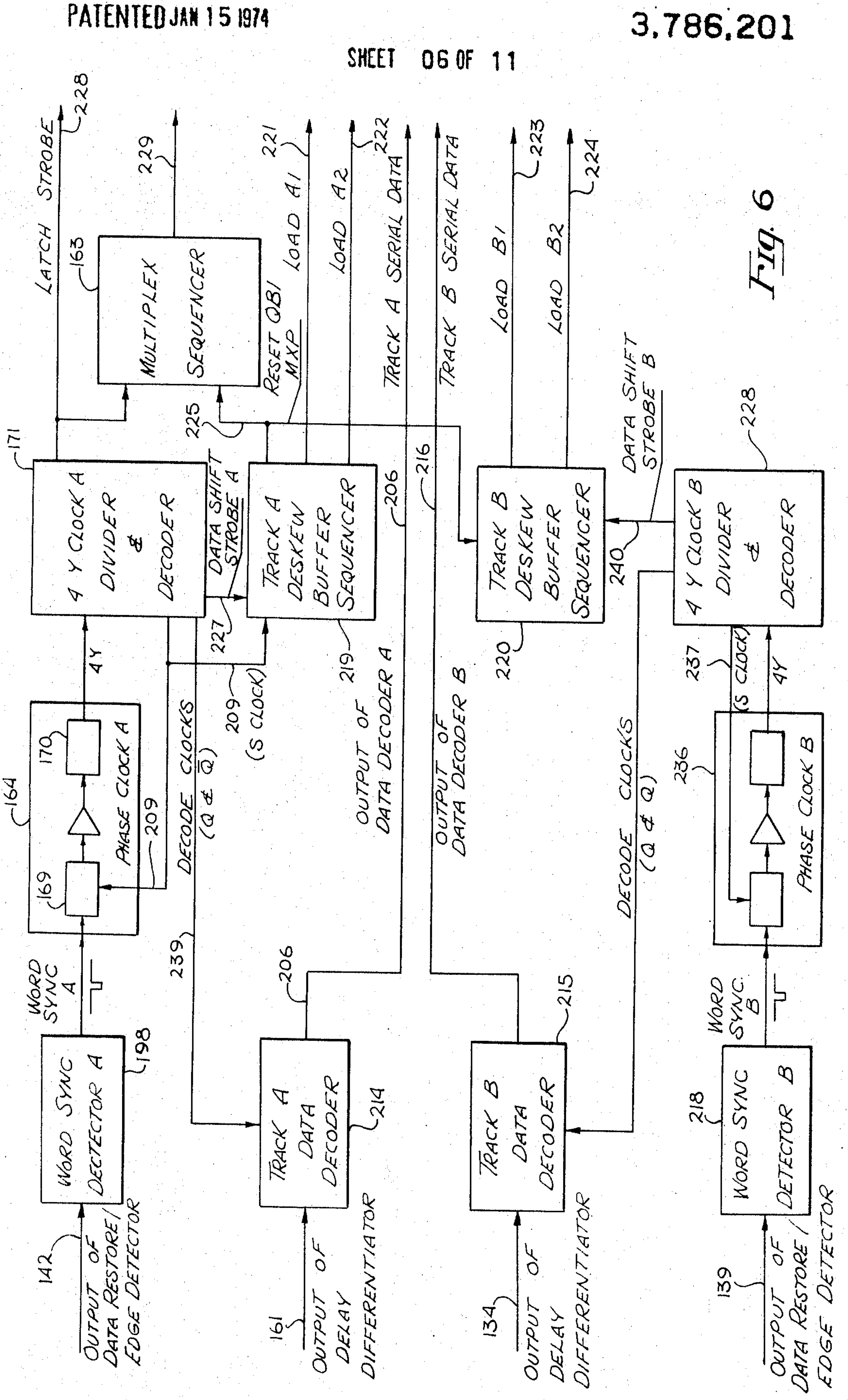
FIG. 6 is a block diagram which illustrates the next section of the reproduce portion of the system.

The input signal to the delay differentiator network is applied to resistors 148 and 150. The other terminal of resistor 148 is coupled to the inverting terminal of operational amplifier 145. The other input or non-inverting terminal of operational amplifier 145 is coupled to ground through resistor 147. The inverting input to amplifier 145 and the output of amplifier 145 are coupled by the resistor 149. The output of operational amplifier 145 is coupled to junction 146 through resistor 151, also resistor 150 is coupled to junction 146. Junction 146 is coupled to one input terminal of operational amplifier 145 through capacitor 152. This input terminal is also coupled to ground through resistor 158 and through diodes D-1 and D-2, one of said diodes having its anode connected to said input and the other having its cathode connected to said input. The other input terminal of operational amplifier 160 is coupled to ground through resistor 159. The output of operational amplifier 160 is coupled through lead 161 to the data restore/edge detector 137 and to the track-A data decoder 214 (FIG. 6).

In the hysteresis network shown in dotted line 140 the output from the reproduce and conditioning amplifier 130 is coupled to the input of amplifier 156 through capacitor 153. The input terminal to amplifier 156 is coupled to ground through the series combination of diode D-3, capacitor 157 and also through the series combination of diode D-4 and capacitor 154. The output of amplifier 156 is coupled to potentiometer 158 via capacitor 156, with the slide of potentiometer 158 being coupled to one input terminal of each of the comparators 143 and 144. The other input terminal of comparator 143 is coupled to the junction formed by the diode D-4 and the capacitor 154, while the other input terminal of comparator 144 is coupled to the common junction of diode D-3, capacitor 157. The output of both comparators 143 and 144 is coupled to data restore/edge detector means 137 by lead 159.

In a similar manner delay differentiator network 132 and hysteresis network 133 are coupled by leads 134 and 135, respectively, to the data restore/edge detector 141.

The amplifiers, resistors, capacitors and diodes shown in FIG. 5 may be standard commercially available electrical components.

Referring to FIG. 7, the arrangement of that graph is similar to the arrangement of FIG. 4 with the top line indicating bit time, and the second line indicating word organization. The third line indicates the typical waveform for the reproduced voltage that would result from the playing back of the "Write Signal" shown in FIG. 4. The fourth and fifth lines of FIG. 7 represent typical waveforms for the output of the delay differentiator and the hysteresis networks, respectively.

The delay differentiator network performs the function of providing a low noise method of differentiating. The input signal to this network is applied to two paths, these paths being algebrically added at junction 146. The first path comprises the resistor 150 while the second path includes the operational amplifier 145. The signal, as it passes through the operational amplifier 145, is delayed by an order of a magnitude of approximately 100 nanoseconds as compared to the signal which passes through resistor 150. In addition, the amplifier 145 inverts the input signal so that the algebraic addition at junction 146 is, in effect, a subtraction of the signal in one path from the signal in the other path. The signal at point 146 is squared by amplifier 160. Diodes D-1 and D-2 are utilized to prevent the amplifier 160 from being over-driven. The output wave form of a typical output signal from amplifier 160 and lead 141 are shown in FIG. 7 on the line entitled "Delay Differentiator Network Output." Thus, this network is utilized for peak detection of the recorded signal, while the hysteresis circuit is utilized to produce a control signal based on the peak amplitude ratios of the recorded signal.

Within the hysteresis network, shown within dotted line 140, the signal from the reproduce conditioning amplifier 130 is coupled to the common junction of diodes D-3 and D-4. These diodes, in combination with the capacitors 154 and 154, respectively, determine reference levels for the comparators 143 and 144. This circuit has a symmetrical hysteresis and automatically maintains a constant ratio between the peak values of the input signal and the range of the hysteresis. This ratio can be adjusted by means of potentiometer 158. The output from the hysteresis network is shown on the line entitled "Hysteresis Network Output" in FIG. 7.

The data restore/edge detectors 137 and 141 each combine the inputs from its respective delay differentiator network and hysteresis network in accordance with a predetermined algorithm such that the modified restored data is produced. The output signal is used, as will be explained by the word sync detectors 198 and 218 (FIG. 6) to produce timing signals for the reproduce portion of the system. The algorithm of the data restore/edge detector is as follows:

a. If the output from the hysteresis network is low and there is a falling edge on the signal from the delay differentiator network, a pulse will be produced by the data restore/edge detector at the time that the delay differentiator signal falls. b. If the signal from the hysteresis circuit is low and there is a rising edge on the signal from the delay differentiator, or if the signal from the hysteresis circuit is high and there is a falling edge on the signal from the delay differentiator, that edge is ignored in addition to the following edge of the signal from the delay differentiator.

c. If the signal from the hysteresis network is high and there is a rising edge on the signal from the delay differentiator a pulse will be produced on the signal output from the data restore/edge detector at the time of the rising edge on the signal from the delay differentiator.

Figure 10:
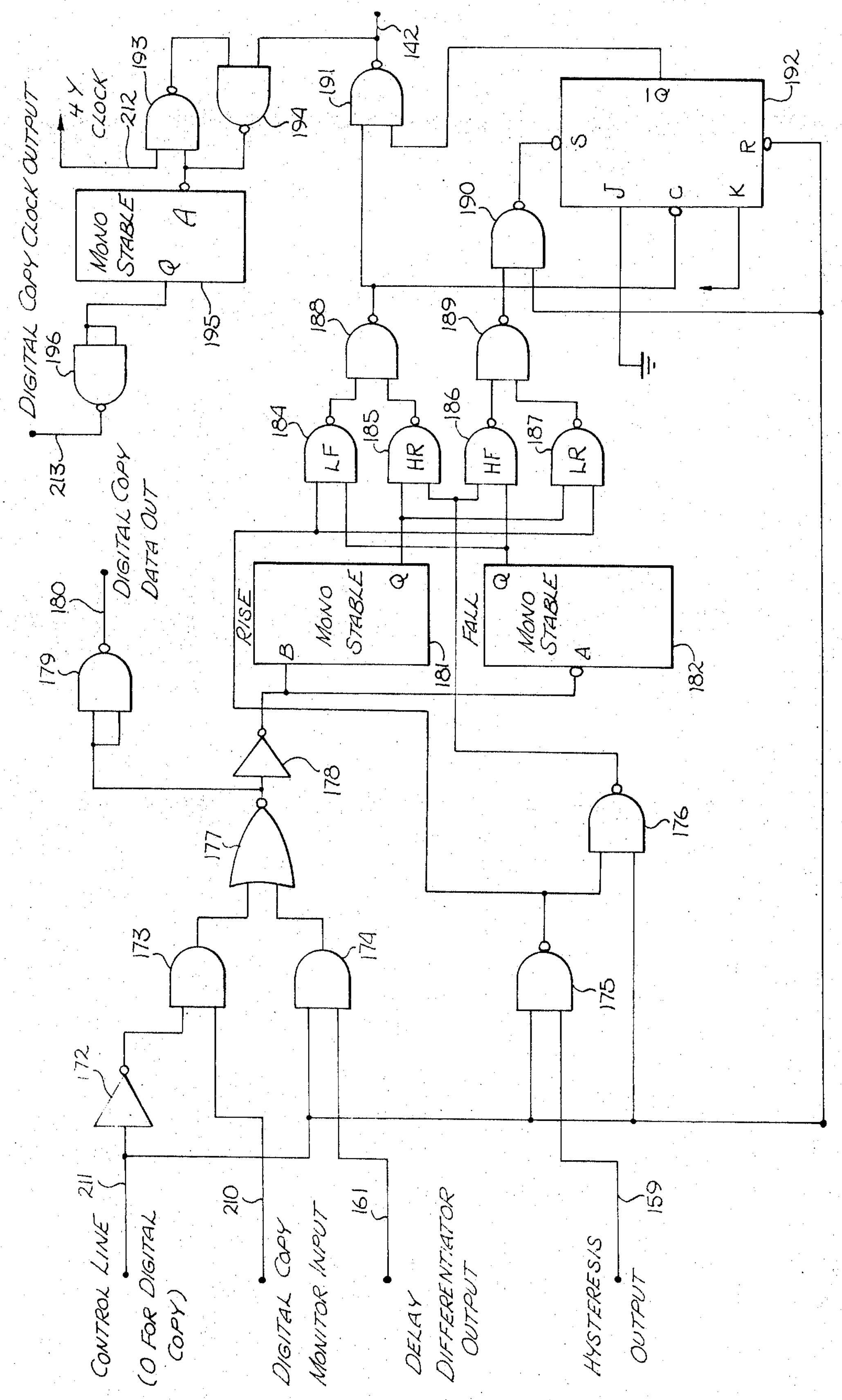
FIG. 10 is an electrical schematic illustrating the data restore/edge detector of FIG. 5.
Figure 22:
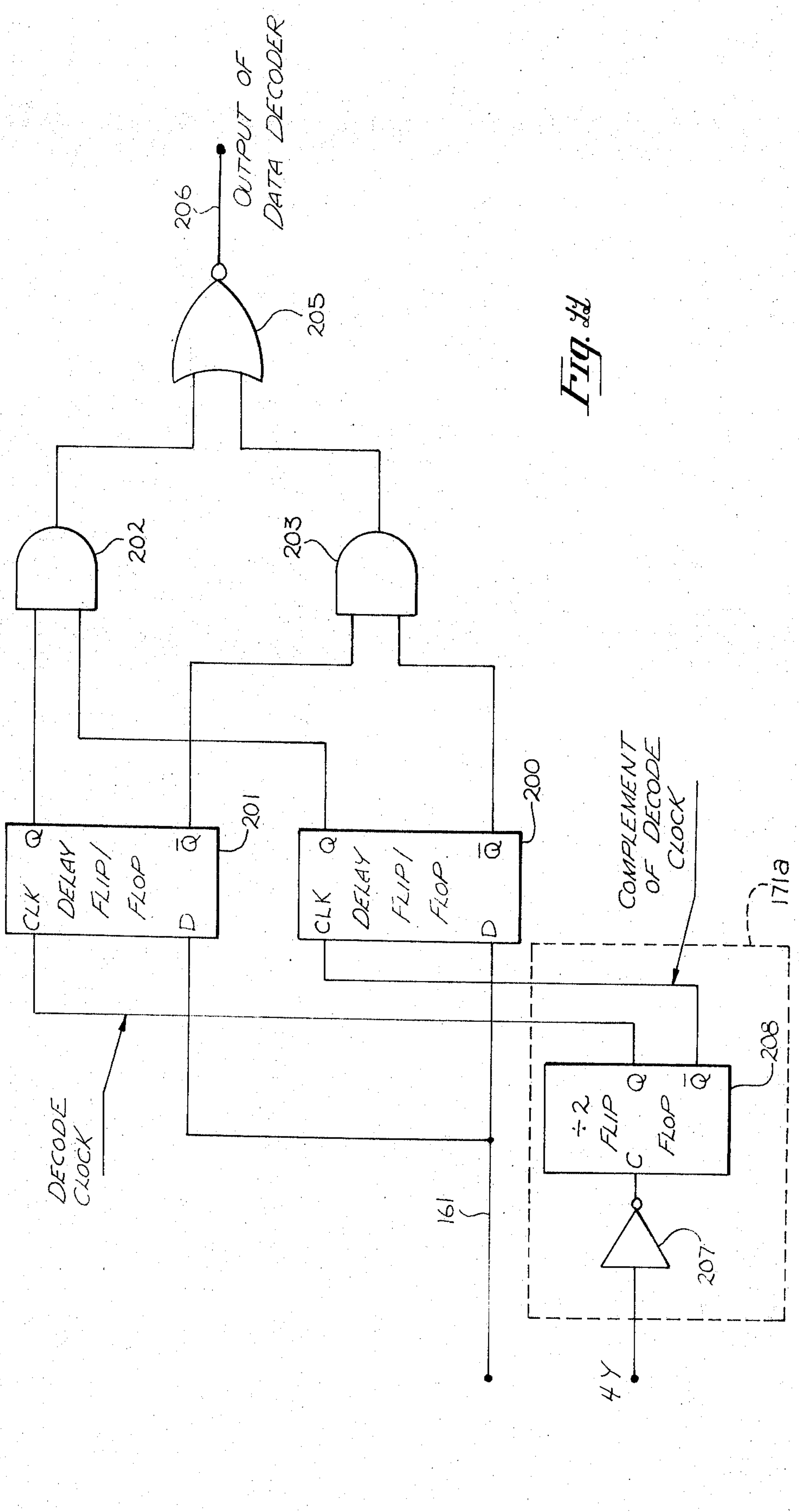

In FIG. 10 a circuit is shown which implements the above algorithm and which may be utilized for the data restore/edge detector 137 and 141 of FIG. 5. The inputs to the circuit of FIG. 10 include the delay differentiator output lead 161 and the hysteresis network output lead 159. In addition, there are two other inputs to the circuit, a control line, lead 211, and a digital copy monitor input, lead 210. As will be explained, these latter two leads are used in conjunction with the digital copying feature explained with FIG. 3. The outputs from the circuit of FIG. 10, lead 142 is shown in FIG. 7 as the "Data Restore/Edge Detector Output." In addition, there is a digital copy clock output signal lead 213.

Lead 211 is coupled through inverter 172 to one input terminal of AND gate 173 with the other input terminal to AND gate 173 being coupled to lead 210. Lead 211 is also coupled to one input terminal of AND gate 174 while the other input terminal to AND gate 174 is coupled to lead 161. The two outputs from AND gates 173 and 174 are coupled to the input terminals of NOR gate 177. Lead 211 is also coupled to one input terminal of NAND gate 175, NAND gate 176, NAND gate 190 and to the direct reset terminal of flip-flop 192. The other input to NAND gate 175 is lead 159, the output from the hysteresis network. The output from NAND gate 175 is coupled to the other input terminal of NAND gate 184 and NAND gate 187. The output from NAND gate 176 is coupled to the input terminal of NAND gate 185 and NAND gate 186. The output of NOR gate 177 is coupled to the input of inverter 178 and to both input terminals of NAND gate 179, which acts as an inverter, its output being coupled to lead 180, the digital copy data output lead. The output of inverter 178 is coupled to the B-terminal of monostable circuit 181 and to the negative A-terminal of monostable circuit 182. The Q-terminal output of monostable circuit 181 is coupled to the other input terminals of NAND gate 185 and NAND gate 187, while the Q-terminal of monostable circuit 182 is coupled to the other input terminals NAND gate 184 and NAND gate 186.

The outputs of NAND gate 184 and NAND gate 185 are coupled to the input terminal of NAND gate 188 and the outputs of NAND gate 186 and NAND gate 187 are coupled to the input terminals of NAND gate 189. The output from NAND gate 188 is coupled to one input terminal of NAND gate 191 and the clock terminal of flip-flop 192. The output from NAND gate 189 is coupled to the other input terminal of NAND gate 190, and the output of NAND gate 190 is coupled to the direct-set ($S_D$) terminal of flip-flop 192. The J-terminal of flip-flop 192 is coupled to ground and the K-terminal is coupled to a source of electrical potential (Logic "one"). The $\overline{Q}$ output of flip-flop 192 is coupled to the other input terminal of NAND gate 191, the output of NAND gate 191 being coupled to lead 142, the output of the data restore/edge detector also shown in FIG. 5. Lead 142 is also coupled to the latch comprising NAND gate 193 and NAND gate 194, with one input to NAND gate 193 being a clock pulse on lead 212, this 4Y clock pulse is also shown in FIG. 7. (This clocking signal, in addition to the other clocking signals used in the reproduce portion of the present system will be explained in conjunction with FIG. 6). The output from NAND gate 194 as well as one input terminal to NAND gate 193, are coupled to the A-terminal of monostable circuit 195. The Q output terminal from monostable circuit 195 is coupled to both input terminals of NAND gate 196, this NAND gate which is operating as an inverting buffer has its output coupled to the digital copy clock output lead 213.

The circuit of FIG. 10 may be constructed utilizing commercially available gating element connected as shown by FIG. 10.

An examination of this circuit will show that it, in fact, implements the algorithm described above. The monostable circuit 181 detects a rising edge of the signal from the delay differentiator while the monostable circuit 182 detects a falling edge signal from that network. The letters in the NAND gates 184 through 187 indicate the circumstances under which no output signal will be produced from that NAND gate. For example, if the hysteresis signal is low (L) and there is a falling edge detected, on the delay differentiator signal (F), a logic "zero" signal will be produced on NAND gate 184; likewise if the hysteresis signal is high (H) and there is a falling edge detected from the delay differentiator signal (F), low logic signal will appear on NAND gate 186. NAND gate 184, NAND gate 185 and NAND gate 188 detect the presence of one condition of the algorithm, a legal condition, whereas NAND gate 186, NAND gate 187 and NAND gate 189 detect the opposite or illegal condition. The flip-flop 192 is utilized to implement the condition that if the hysteresis signal is low when there is a rising edge on the signal from the delay differentiator, or if the signal from the hysteresis circuit is high and there is a falling edge on the signal from the delay differentiator, that edge is ignored in addition to the following edge.

As previously explained, when two recorders are utilized both implemented with the system disclosed herein, digital-to-digital recordings may be made without converting signals to analog form before re-recording. Assuming that the reproduce portion of a system shown in FIG. 5 and FIG. 10 is used as the "master reproducer" from which copies are to be made during the digital-to-digital copying mode, a "0" as no signal is applied to lead 211 (FIG. 10) normally a "1" is applied to this lead). The circuitry shown in FIG. 3 would be in the "slave recorder" that is, the recorder that will produce the copies. To implement the digital-to-digital copy mode, the digital copy clock output lead 213 is coupled to the digital copy clock input lead 108 of FIG. 3, and the digital copy data lead 180 is coupled to the digital copy data in lead 109 of FIG. 3. Lead 110, which provides a monitor drive signal, would be coupled internally to lead 210 of FIG. 10 of the slave recorder. When this is implemented, the digital signals sensed by the magnetic head sections 33a and 33b are re-shaped and re-recorded on the slave recorder by the circuitry shown in FIGS. 3 and 10.

Referring to FIG. 6, the outputs from the delay differentiator networks 138 and 132 of FIG. 5 are coupled to the track-A data decoder 214 on and the track-B data decoder 215, respectively. The purpose of the data decoders 214 and 215 is to decode the data to the form shown in FIG. 7 on the line entitled "Output of Data Decoder." In the presently preferred embodiment the data decoder utilizes a 2Y decode clock signal which is related to the 4Y data derived clock signal, as shown in FIG. 7. The data decoder implements the following algorithm:

a. If the raw data has the same state, that is, high or low, at both ¼-bit time and ¾-bit time the output from the data decoder is a 0.

b. If at ¼-bit time and ¾-bit time the raw data input is of a different state and "1" or a high results at the output of the data decoder.

Referring to FIG. 11, a circuit for implementing this algorithm is shown including means for generating the decode clock and the complement of the decode clock. (The portion of the circuit shown within dotted line 171*a* is actually part of the 4Y clock A divider and decoder 171, FIG. 6 and has been included within FIG. 11 to give a complete explanation of the decoding). The input 4Y timing signal is coupled through inverter 207 to the clock terminal of flip-flop 208. The Q output of flip-flop 208 is coupled to the CLK input of delay flip-flop 201, while the $\overline{Q}$ output of flip-flop 208 is coupled to the CLK terminal of delay flip-flop 200. The flip-flop 208 serves the function of dividing the 4Y clock by 2, note the inverter 207 serves to phase shift the output decode clock coupled to the flip-flops 200 and 201. The input lead 161 is coupled to the D-terminals of the flip-flops 200 and 201. The Q output terminals of flip-flops 200 and 201 are coupled to the input terminals of AND gate 202 while the Q output terminals of flip-flops 200 and 201 are coupled to the input terminals of AND gate 203. The outputs from AND gate 202 and AND gate 203 are coupled to the input terminals of NOR gate 205. The output of NOR gate 205, lead 206, is the output of the data decoder with representative signals being shown in FIG. 7. This circuit, which may be built with ordinary components, implements the above algorithm with AND gate 202, AND gate 203 and AND gate 205 forming an AND-OR-INVERT tree. It can be seen that when the output of the data decoder is loaded into a shift register by "Data Shift Strobes" FIG. 7 that "Recovered True Data" FIG. 7 results. The circuit of FIG. 11 may of course, be used for the track-B data decoder 215.

In the reproduce portion of the system, the timing signals have been referred to as multiples of the letter Y. As will become apparent, if the tape speeds for recording and reproducing the digital signals are identical, then X will equal Y. In the reproduce portion of the system Y is determined by the tape speed, or more particularly, the rate at which the preamble of each digital word is detected. Referring to FIG. 6, word sync pulses are generated by the word sync detector 198 for track-A and by the word synchronization detector 218 for track-B. As will be seen, track-A and track-B are not necessarily in synchronization, that is, each of the data tracks are asynchronous and self-clocking and are asynchronously loaded into the deskewing buffers 165 and 166, FIG. 8. This is necessary to deal with and solve the problem associated with tape skew. Any one of numerous known circuits may be used to develop the synchronization pulses from the preamble of each digital word with the detector 198 and 218.

In the presently preferred embodiment, the word sync pulses are developed by use of a sawtooth generator and comparator circuit. Note that the modified restored data always includes two pulses reproduced by 2-½-bits times (modified preamble) at the beginning of each word and that no possible combination of other data within the words can produce a signal which resembles the 2-½-bits times the deposition of the preamble pulses because of the encoding logic. The sawtooth generator of word sync detector 198 generates a sawtooth wave form each time it receives a pulse on lead 142. The maximum amplitude of each of the sawtooth waves generated is stored by the word synch detector 198 and is compared with the maximum amplitude of the next sawtooth wave generated. If the maximum amplitude of the generated sawtooth wave form is greater than approximately 125 percent of the stored reference, a word sync pulse is generated. These word sync signals are a function of tape speed and will vary with tape speed. Even if there is a change in tape speed from word to word this will be reflected in the output of detector 198 since that circuit utilizes as a basis for comparison a reference which is updated with each and every sawtooth wave generated. Word sync detector 198 may be identical to detector 215, both may utilize standard circuitry.

The word sync pulses for track-A and track-B from detectors 198 and 218 are coupled to phase locks 164 and 236, respectively. Phase lock A and phase lock B generate a 4Y timing signal; this timing signal is shown in FIG. 7 and is of a frequency of 28 times the word synch pulses. Note that the 4Y clock signal for track-A is not synchronized with the 4Y clock signal for track-B. The phase lock A 164 comprises a phase detector 169 coupled to a voltage control oscillator 172 by an amplifier. The voltage control oscillator has a nominal frequency of approximately 924 K Hz in the presently preferred embodiment but is adaptable for oscillating over a wide range of frequencies centered about 924 K Hz. An S clock signal generated by 4Y clock A divider and decoder 171 is coupled to the phase detector 169 via lead 209. The S clock signal which is generated by means 171 comprises pulses of the same frequency as the word synch pulses but out of phase with that signal such that the trailing edges of the S clock signal coincide with the leading edges of the word synch pulses. The phase detector 169 detects the phase difference between the S clock signal negative edge and the word synch pulses negative edge and produces an output voltage to control the voltage control oscillator 170. Note that if for some reason word synch pulses are not detected, the voltage control oscillator 170 will continue to operate nonetheless and produce a 4Y clock. Phase lock A 164 may comprise a standard voltage control oscillator and phase detection network. Phase lock B 236 may be identical to phase lock A 164 and also includes a phase detector and voltage control oscillator, the phase detector being coupled to an S clock signal generated by the 4Y clock B divider and decoder 238 by lead 237.

Figure 9:
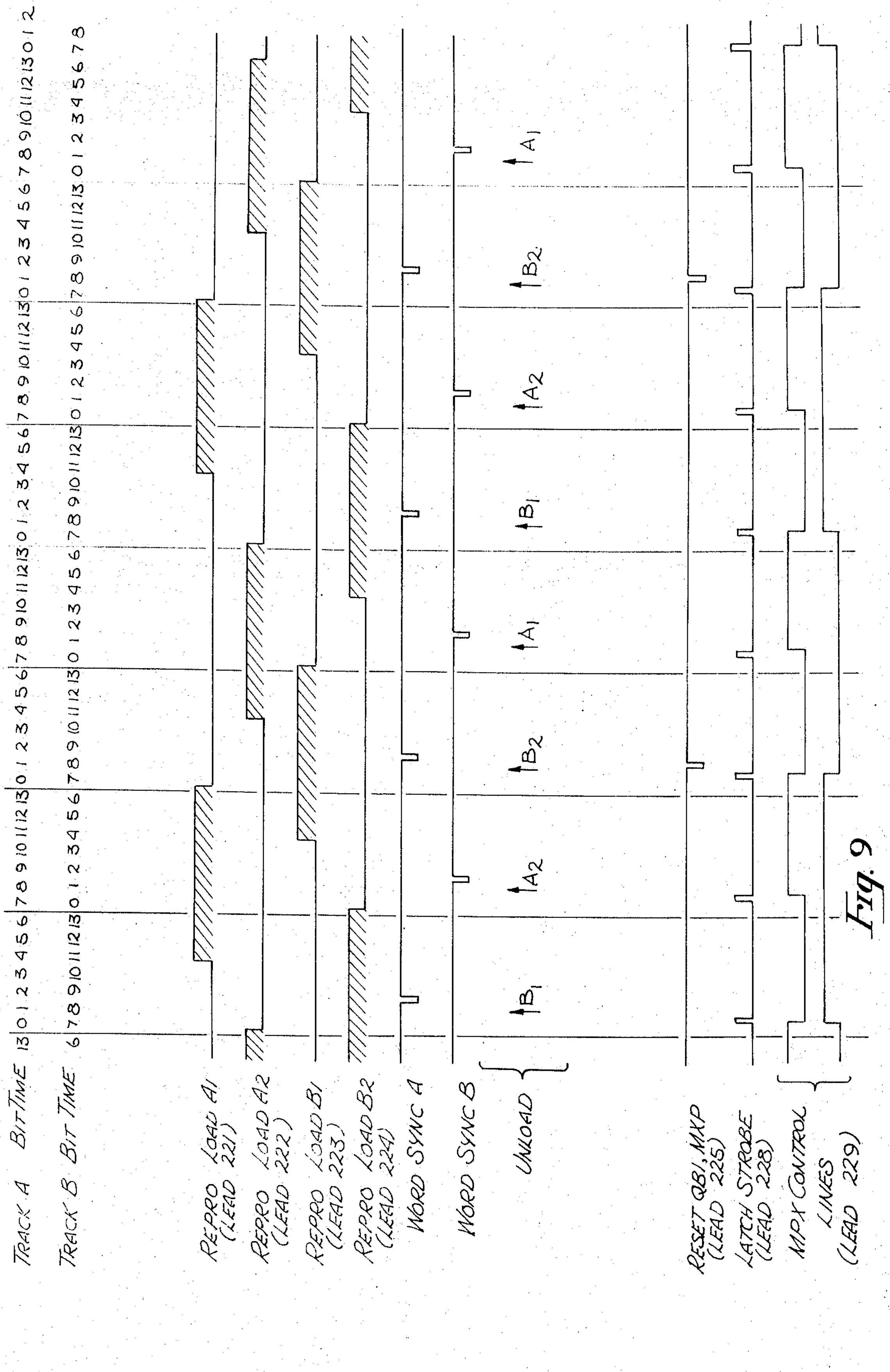
FIG. 9 is a graph illustrating the various waveforms associated with the deskewing feature of the reproduce portion of the system.

The 4Y clock A divider and decoder 171 receives the 4Y clocking signal from phase lock A 164 and generates: (1) a decode clock and a complement of a decode clock shown as Q and $\overline{Q}$ on lead 239, (2) the S clock which is coupled by lead 209 to the phase detector 169 and to the track-A deskew buffer sequencer 219, (3) a latch strobe signal on lead 228, and (4) a data shift strobe A on lead 227. The portion of the decoder 171 which generates the decode clocks has previously been described in conjunction with FIG. 11 and shown within dotted line 171*a* of that figure. The data shift strobes generated by the decoder 171 are shown in FIG. 7 and comprise pulses as strobing signals generated for each bit time following the ranging bits and the adjusted modified amplitude bits. The latch strobe signal generated by decoder 171 comprises pulses generated twice per word as indicated in FIG. 9 under the line entitled "Latch Strobe" for the times shown for track-A bit time in that figure. The circuitry of the 4Y clock A divider and decoder may comprise ordinary digital circuitry adaptable to generating the signal discussed. 4Y clock B divider and decoder 238 may be identical to decoder 171 except that decoder 238 does not generate a latch strobe signal since only the latch strobe signal generated in conjunction with track-A is utilized for reproducing the analog signal. The data shift strobe B signals are coupled to track-B deskew buffer sequencer 220 by lead 240. As with the case with the 4Y clocks with track-A and track-B, the data shift strobes A and B are not synchronized between track-A and track-B but rather synchronized with the work synch pulses from their respective tracks.

Figure 8:
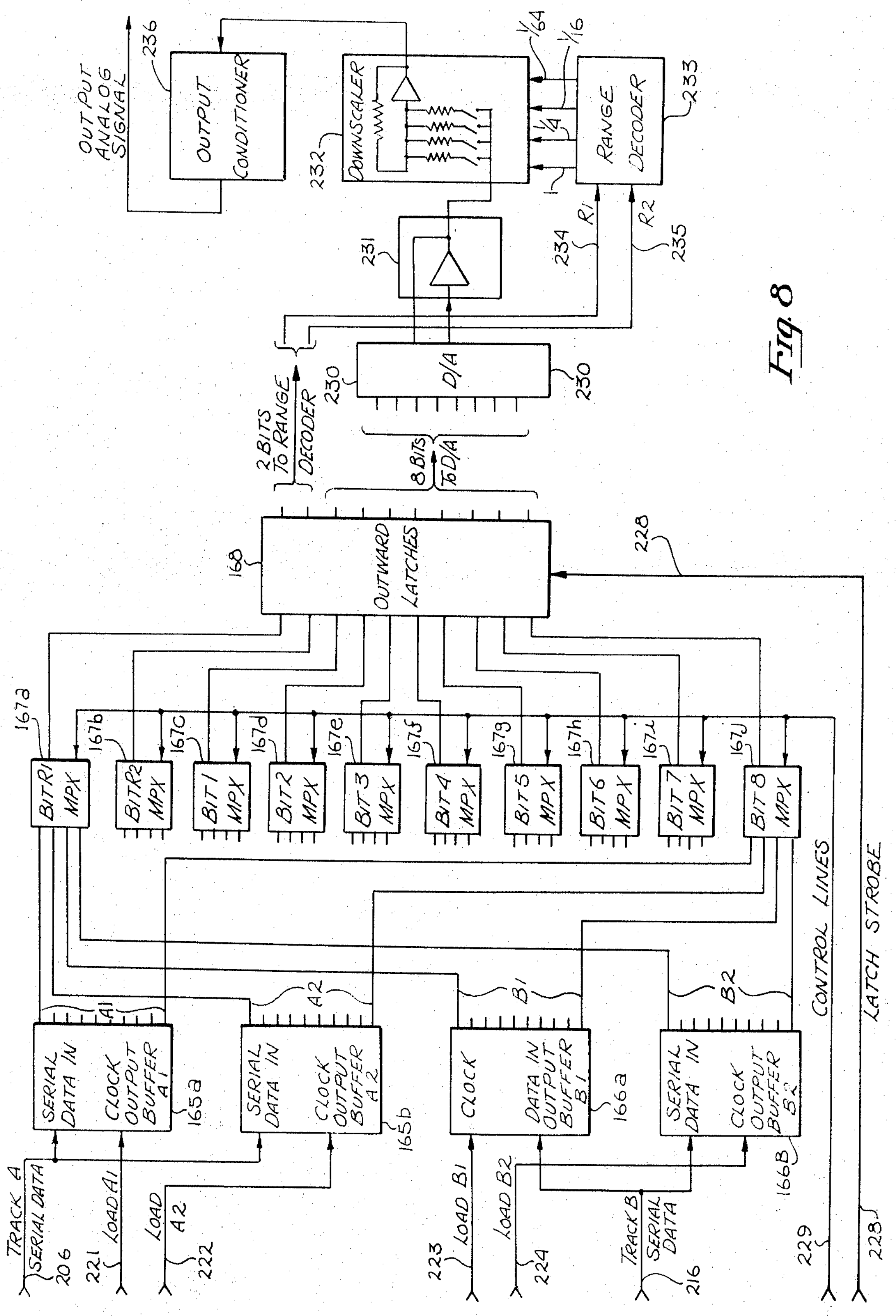
FIG. 8 is a block diagram which illustrates the remaining section of the reproduce portion of the system and in particular describes the deskewing buffer organization.

The track-A deskew buffer sequencer 219 generates loading signals which are used to alternately load words from track-A into separate buffers shown in FIG. 8 as buffers 165a and 165b. Sequencer 219 generates the loading signals shown in FIG. 9 as "Repro Load A-1" and "Repro Load A-2" on leads 221 and 222, respectively. These signals are generated from the S clock and the data shift strobe A signals, and may be generated using ordinary digital circuitry. Likewise, track-B deskew buffer sequencer 220 generates loading signals to allow digital words from track-B to be alternately loaded into buffers 166*a* and 166*b*, the loading signals being communicated to these buffers on leads 223 and 224 respectively. These signals are shown in FIG. 9 as "Repro Load B-1" and "Repro Load B-2"

Sequencer 219 includes an additional function not performed by sequencer 220. Sequencer 219 also generates a reset QB1 MXP signal which is coupled by lead 225 to multiplex sequencer 163 and to track-B deskew buffer sequencer 220. The waveform of this signal is shown in FIG. 9. This signal may be readily generated from the signals received by sequencer 219 on leads 209 and 227. The purpose of this signal is to insure that the sequence in which data is loaded and multiplexed out of the two pair of buffers 165*a* and 165*b* and 166*a* and 166*b* is performed in a predetermined sequence. In the presently preferred embodiment the sequence as shown in FIG. 9, is that buffer 166a begins loading while buffer 165*a* is completing its loading; buffer 165*b* begins loading while buffer 166*a* is completing its loading; and buffer 166*b* begins loading while buffer 165b is completing its loading. The purpose of loading the buffers in this sequence will become apparent in conjunction with the explanation of FIG. 8 and is primarily utilized to eliminate the problems associated with tape skew.

Multiplex sequencer 163 has as its input the reset QB1 MPX signal, lead 225, and the latch strobe signal, lead 228. From these two signals multiplex sequencer 163 generates two binary signals which are coupled by control lines 229 to the multiplexes 167*a* through 167*j*. These binary signals control the multiplexers and determine which one of the four buffers 165*a*, 165*b*, 166*a*, and 166*b* will be coupled to the multiplexers. Thus, the signals on control lines 229 are coupled to the multiplexes 167*a* through 167*j* of FIG. 8. The output waveform for the multiplex sequencer 163 is shown in FIG. 9 under the line indicated at "MPX Control Lines (Lead 229)." It is readily apparent that these signals may be generated using known digital circuitry such as a word counter from the input signals to multiplex sequencer 163.

Referring now to FIG. 8, the remaining section of the reproduce portion of the system is illustrated and includes the output buffers for track-A and track-B, buffers 165*a*, 165*b*, 166*a* and 166*b*. The load A-1 signal is coupled to buffer 165*a* on lead 221 and the load A-2 signal is coupled to buffer 165*b* on lead 222. Likewise, the load B-1 signal is coupled to buffer 166*a* on lead 223 and the load B-2 signal is coupled to buffer 166*b* on lead 224. Each of the buffers 165*a*, 165*b*, 166*a* and 166*b* may comprise ordinary digital buffers which include shift registers adaptable for receiving a serial input digital signal and for transmitting the digital signal in parallel form. The track-A serial data from the track-A data decoder 214 of FIG. 6 is coupled by lead 206 to both the track-A buffers $A_1$ and $A_2$, (buffers 165*a* and 165*b*). Similarily, data in serial form from track-B is coupled from the track-B data decoder 215 by lead 216 to the track-B buffer $B_1$ and $B_2$ (buffers 166*a* and 166*b*).

Multiplexers 167*a* through 167*j* each comprises a standard digital multiplexer adaptable for receiving a single digital bit from one of the four buffers 165*a*, 165*b*, 166*a* and 166*b* on command from multiplex sequencer 163. Thus, each of the multiplexers are simultaously coupled to one of the four buffers in accordance with a predetermined sequence. Each of the multiplexers is designated as receiving either one of the two ranging bits, R-1 or R-2, (multiplexers 167*a* and 167*b*) and one of the eight adjusted magnitude bits (multiplexers 167*c* through 167*j*).

The outputs of the multiplexers are coupled to output latches 167 which comprises an output digital buffer. An ordinary digital buffer may be used in this application, since the buffer is utilized to accept signals from the multiplexers 167*a* through 167*j* and upon receiving a latch strobe on lead 228 to transmit a digital word which comprises the two ranging bits to range decoder 233 and the eight adjusted magnitude bits to the digital-to-analog converter 230.

Digital-to-analog converter 230 may be an ordinary digital-to-analog converter which in the presently preferred embodiment is adaptable for receiving eight digital bits for converting them to an analog signal. Amplifier 231 is a high slew rate amplifier which converts the D/A output current to voltage for transmission to the downscaler 232. Downscaler 232 comprises an amplifier with feedback, the amplifier having a variable gain which may be varied or adjusted to four predetermined gains, 1, ¼, 1/16, or 1/64. The gain of the downscaler 232 is controlled by signals from range decoder 233 which activate the switching shown in downscaler 232. An ordinary amplifier may be utilized in this application and any one of numerous well known means for varying the gain of such an amplifier may be utilized in lieu of the switches and resistors shown within the downscaler 232. The transfer function for the downscaler is the inverse function of the sample and hold means with its control means for varying its gain.

Range decoder 233, which is coupled to output latches 168 via lead 234 and 235 includes logic circuitry for actuating one of the four switches within down scaler 232 with the reciprocal of the appropriate gain associated with the bits R-1 and R-2. For example, referring again to the truth table shown within range encoder 15 of FIG. 1, if the output from the multiplexers 167*a* and 167*b* both are 0's, then range encoder will couple a signal to downscaler 232 such that the overall gain of downscaler 232 would be 1/64. Ordinary digital circuitry may be utilized to implement range decoder 233.

The output of downscaler 232 is coupled to output conditioner 236; this means is utilized to perform filtering and buffering, as is customarily done both in audio and sample data systems. The output from the output conditioner 236 will be reconstructed input audio signal applied on lead 12, FIG. 1.

The operation of the reproduce sections of the system may be readily understood with reference to FIGS. 6 and 8 and FIGS. 7 and 9. The output from the data decoder 214 is alternately loaded into output buffers 165*a* and 165*b*. Likewise, the data output from decoder 215 is alternately loaded into buffers 166*a* and 166*b*. While the timing for these two pairs of buffers is not synchronized the loading sequence of these buffers is controlled by the signal from the sequencer 219, lead 225, so that the loading occurs in the sequence shown in FIG. 9. Thus, even though the loading signals shown in FIG. 9 may not be in the same phase relationship as shown, the loading sequence nonetheless will be as shown. The unloading sequence from the buffers, that is, the sequence in which the multiplexers 167*a* through 167*j*, accept signals from one of the buffers as shown in FIG. 9, on the line "Unload," is controlled by the MPX control lines, lead 229 in a predetermined sequence, and in accordance with timing signals associated with only one of the tracks, track-A. It is readily apparent that as the data signals are accepted by the multiplexers 167*a* through 167*j* in the sequence indicated, they will be transferred to the range decoder and to the digital-to-analog converter 230 by the output latches 167 on command of the latch strobe in a sequence such that the output of latches 168 will represent the recovered true data shown in FIG. 7.

The recovered true data shown in FIG. 7 corresponds to the typical data word shown in FIG. 4 except that the preamble associated with each word is not part of the output of the multiplexers 167. The reason the preamble is not shifted into the output buffers is that the load $A_1$, $A_2$, $B_1$, and $B_2$ signals are of appropriate duration to accept only the ranging bits and the adjusted magnitude bits and not the preamble bits. In this regard it should be recalled that the data shift strobe signals transmitted to the track-A deskew buffer sequencer 219 and the track-B deskew buffer sequencer 220 of FIG. 6 included strobes associated only with the ranging bits and the adjusted magnitude bits and did not provide strobing signals which would enable the transmission to the output buffers of the preamble signal.

It is readily apparent that with the use of two pairs of output buffers which permit asynchronous loading of the track-A data and track-B data mis-aligned, caused by tape skew, will not affect the operation of the system. With the system in its presently preferred embodiment either track may be misaligned in either direction by as much as seven bits without any difficulty occurring in reconstructing or recovering the digital data. It will be apparent to one of ordinary skill in the art that if greater time misalignment between the recorded tracks of digital information occurs each track may utilize additional buffers such as buffers 165*a* and 165*b* to permit the deskewing of even greater time misalignment than seven bits.

The output form the digital-to-analog converter, along with the information supplied by the range decoder, permits the downscaler 232 to downscale the analog signal from converter 232, that is, to perform the opposite amplification as is performed by the sample and hold means of FIG. 1, thus providing a reconstructed analog signal similar to the signal applied to the input lead 12 of FIG. 1.

With the use of the above described recording and reproduce technique it has been found that the data is compressed and hence more information may be recorded per given length of tape than with conventional coding techniques such as bi-phase, Manchester or other self-clocking codes. Additionally, pulse crowding and level shift, a common problem with prior art systems, is reduced with the above described techniques.

Thus a system has been disclosed for converting an analog signal such as an audio signal to digital signal and for reconstructing the analog signal from the digital signal. It should be noted that whereas in the presently preferred embodiment the digital signal or signals were recorded the signals could rather have been transmitted over conventional transmission means and then reconverted to analog signals. Also if a "stereo system" were utilized the recording or transmission system could include four tracks for the presently preferred embodiment in lieu of the two tracks shown in the present disclosure which would normally accommodate a "monaural system," similarily in multi-track professional recording any number of audio channels may be converted into digital utilizing an appropriate number of tracks.

We claim:

1. A system for preparing an analog signal for recording or transmission in digital form comprising:

sample and hold means, for sampling said analog signal, said means having a variable gain;

control and timing means for sensing said analog signal and for providing a control signal for varying the gain of said sample and hold means as a function of the magnitude of said analog signal and for providing timing information for said sample and hold means, said control means being coupled to said sample and hold means;

an analog-to-digital converter for converting the output signals of said sample and hold means into digital signals;

whereby the output of said analog-to-digital converter and signals representative of the gain of said sample and hold means may be recorded or transmitted.

2. The system defined in claim 1 wherein said sample and hold means comprises two sample and hold circuits coupled in series, each of which includes at least one amplifier, the gain and sampling rate of which is varied by said control means.

3. The system defined in claim 1 including means for reproducing the analog signal from the recorded or transmitted reproduce signal, said reproducing means including:

a delay differentiator network for sensing the input reproduce signal and for providing an output signal representative of the differentiator of the input reproduce signal;

a hysteresis network for producing a control signal based on peak and amplitude ratios of the input reproduce signal and for providing an output signal representative of said peaks;

a combining means coupled to said delay differentiator network and hysteresis network for combining the outputs of said networks in accordance with a predetermined algorithm.

4. The system defined in claim 1 wherein the output of said analog-to-digital converter is alternately coupled to at least a first and second buffer such that the digital signal representative of the input analog signal may be recorded or transmitted as two separate digital signals.

5. The system defined in claim 4 including reproduce means for converting the recorded or transmitted digital signal into analog form, said reproduce means including at least two pairs of digital buffers, each pair of which may be asynchronously clocked, so that when one of said separate digital signals loaded into one pair of buffers and the other separate digital signal loaded into the other pair of said buffers, the buffers may be asynchronously clocked so that the two separate digital signals may be converted into a single digital signal and any time misalignment problems between the two separate digital signals such as those caused by magnetic tape skew may be eliminated.

6. The system defined in claim 4 wherein time delay means for providing a time delay is coupled to said sample and hold means such that said input analog signal is delayed before reaching the sample and hold means.

7. The system defined in claim 6 including at least two buffers for receiving digital signals, coupled to said analog-to-digital converter, such that signals from said analog-to-digital converter are alternately applied to said first buffer and then to said second buffer, so that the output of said analog-to-digital converter may be recorded or transmitted on two separate tracks.

8. The system defined in claim 6 wherein the time delay of said delay means is approximately equal to the time required for said control means to sense the input analog signal and to vary the gain of said sample and hold means and the aperture time of the first sample and hold circuit.

9. The system defined in claim 8 wherein the variable gain of said sample and hold means comprise a plurality of predetermined fixed gains.

10. The system defined in claim 9 including two means for encoding digital signals wherein the output from said analog-to-digital converter is alternately applied to the first means for encoding and then to the second means for encoding, such that the digital signals representative of the input analog signal may be separated into two separate tracks.

11. A system for converting an input analog signal to digital form comprising:

a comparator circuit for sensing the input analog signal and for providing an output signal which indicates the range of the magnitude of the input signal;

a sample and hold means for sampling said input analog signal, said means having a variable gain;

encoding means for varying the gain of said sample and hold means in accordance with predetermined logic and as a function of said output signal of said comparator circuit, said encoding means being coupled to said comparator circuit and said sample and hold means;

timing means for providing a sampling rate coupled to said encoding means such that said gain of said sample and hold means is controlled through said encoding means by at least one signal which controls both said sampling rate and said gain;

an analog-to-digital converter, for converting the samples from said sample and hold means to digital form, coupled to said sample and hold means;

whereby the digital signals from said analog-to-digital converter and a signal representative of the gain of said sample and hold means may be recorded or transmitted.

12. The system defined in claim 11 including means for reproducing the analog signal from the recorded or transmitted reproduce signal, said reproducing means including:

a delay differentiator network for sensing the input reproduce signal and for providing an output signal representative of the differentiator of the input reproduce signal;

a hysteresis network for producing a control signal based on peak amplitude ratios of the input reproduce signal and for providing an output signal representative of said peaks;

a combining means coupled to said delay differentiator network and hysteresis network for combining the outputs of said networks in accordance with a predetermined algorithm.

13. The system defined in claim 11 including means for encoding the output of said analog-to-digital converter and a digital signal representative of the gain of the sample and hold means for each sample of said input signal prior to the recording of said digital signals.

14. The system defined in claim 13 wherein said encoding means implements the following algorithm:

a. if a clocking signal having a frequency of twice the bit frequency of the data comprising the output of said converter and said digital signal representative of said gain, is in a first state and said data is in said first state, an encoded signal in one state will result.

b. if either the data or clocking signal is in a first state and the other of said data or clocking signal is in a second state, an encoded signal in the other state will result.

15. The system defined in claim 13 including reproduce, means for converting the recorded or transmitted digital signal into analog form, said reproduce means including at least two pairs of digital buffers, each pair of which may be asynchronously clocked, so that when one of said separate digital signals loaded into one pair of buffers and the other separate digital signal loaded into the other pair of said buffers, the buffers may be asynchronously clocked so that the two separate digital signals may be converted into a single digital signal and any time misalignment problems between the two separate digital signals such as those caused by magnetic tape skew may be eliminated.

16. The system defined in claim 11 wherein said sample and hold means comprises two sample and hold circuits coupled in series, each of which includes at least one amplifier the gain and sampling rate of which are controlled by said encoding means.

17. The system defined in claim 16 wherein the output from said encoding means which controls the gain and sampling rate of said sample and hold means includes a plurality of binary signals.

18. The system defined in claim 17 wherein time delay means for providing a time delay is coupled to said sample and hold means such that said input analog signal is delayed before reaching the sample and hold means.

19. The system defined in claim 18 wherein the time delay of said delay means is approximately equal to the time required for said comparator circuit and said encoding means to sense the input analog signal and to vary the gain of said sample and hold means and the aperture time of the first of said two sample and hold circuits.

20. The system defined in claim 17 wherein the variable gain of said sample and hold means comprise a plurality of predetermined fixed gains.

21. The system defined in claim 20 wherein the input analog signal is an audio signal, said sample and hold means has four predetermined gains and wherein said encoding means provides digital signals representative of said predetermined gains of said sample and hold means as said gains are varied by said encoding means.

22. A system for recording an audio input signal in digital form comprising:

a sample and hold means for sampling said input signal and for providing output samples of said input signal, said sample and hold means having a plurality of predetermined gains;

control means for sensing the input signal and for providing a control signal for selecting said predetermined gains of said sample and hold means as a function of the amplitude of said input signal;

timing means for controlling the sampling rate of said sample and hold means coupled to said control means such that said control signal controls said sampling rate of said sample and hold means;

an analog-to-digital converter for converting the output samples of said sample and hold means into digital signals;

recording means for recording the output digital signals from said analog-to-digital converter;

whereby the audio input signal is recorded in digital form.

23. The system defined in claim 22 including means for reproducing the analog signal from the recorded or transmitted reproduce signal, said reproducing means including:

a delay differentiator network for sensing the input reproduce signal and for providing an output signal representative of the differentiator of the input reproduce signal;

a hysteresis network for producing a control signal based on peak amplitude ratios of the input reproduce signal and for providing an output signal representative of said peaks;

a combining means coupled to said delay differentiator network and hysteresis network for combining the outputs of said networks in accordance with a predetermined algorithm.

24. The system defined in claim 22 wherein said control means includes means for generating digital signals representative of the selected predetermined gain of said sample and hold means and wherein said signals are coupled to said recording means for recording along with the output of said analog-to-digital converter.

25. The system defined in claim 24 wherein the output of said analog-to-digital converter is alternately coupled to a first buffer means and then to a second buffer means so that the digital signal representative of said input audio signal may be recorded on two tracks on said recording means.

26. The the system defined in claim 25 wherein said recording means is a magnetic tape recorder.

27. The system defined in claim 24 wherein said sample and hold means comprises two sample and hold circuits, coupled in series, each of which includes at least one amplifier, the gain of which is adjusted by said control means.

28. The system defined in claim 27 wherein the output of said analog-to-digital converter is alternately coupled to a first buffer means and then to a second buffer means so that the digital signal representative of said input audio signal may be recorded on two tracks on said recording means.

29. The system defined in claim 27 wherein time delay means for providing a time delay is coupled to said sample and hold means such that said input audio signal is delayed before reaching said sample and hold means.

30. The system defined in claim 29 wherein the time delay of said delay means is approximately equal to the time required by said control means to sense said input audio signal and to select one of said plurality of predetermined gains of said sample and hold means and the aperture time of said first circuit of said sample and hold means.

31. The system defined in claim 30 wherein said recording means is a magnetic tape recorder.

32. A system for converting an input analog signal into a digital signal for recording or transmission and for reconstructing the analog signal from the transmitted or recorded digital signal comprising:

a sample and hold means for sampling the input analog signal and for providing periodic output samples of said analog signal, said sample and hold means having a variable gain;

control means for sensing said input signal and for providing a control signal for controlling the gain of said sample and hold means as a function of the amplitude of said input analog signal;

at least one analog-to-digital converter for converting the output samples from said sample and hold means into digital form coupled to said sample and hold means;

at least two buffers for alternately receiving signals from said analog-to-digital converter such that the output from said analog-to-digital converter is separated into at least two separate signal tracks;

at least two encoding means, one coupled to each of said buffer for encoding the digital outputs from said buffers and digital signals representative of the gain of said sample and hold means in accordance with a predetermined algorithm;

at least a pair of decoding means for decoding the digital signals from said encoding means in accordance with a predetermined algorithm, said decoding means coupled to said encoding means through a recording medium or transmission medium;

at least one digital-to-analog converter coupled to said decoding means for converting at least a portion of each digital word into analog form;

at least one amplifier coupled to said digital-to-analog converter for amplifying the signal from said digital-to-analog converter as a function of said digital signals representative of the gain of said sample and hold means;

whereby the output of said amplifier means is a reconstructed input analog signal.

* * * * *